US012782897B2

(12) United States Patent
Hashizume et al.

(10) Patent No.: US 12,782,897 B2
(45) Date of Patent: Nov. 3, 2026

(54) SCADA WEB HMI SYSTEM

(71) Applicant: TOSHIBA MITSUBISHI-ELECTRIC INDUSTRIAL SYSTEMS CORPORATION, Tokyo (JP)

(72) Inventors: Takaharu Hashizume, Tokyo (JP); Hiroyuki Fujieda, Tokyo (JP); Ryo Shimizu, Tokyo (JP); Akira Nojima, Tokyo (JP); Nobuo Shimizu, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 440 days.

(21) Appl. No.: 18/293,777

(22) PCT Filed: Mar. 22, 2023

(86) PCT No.: PCT/JP2023/011286
§ 371 (c)(1),
(2) Date: Jan. 31, 2024

(87) PCT Pub. No.: WO2023/182373
PCT Pub. Date: Sep. 28, 2023

(65) Prior Publication Data

US 2025/0123609 A1 Apr. 17, 2025

(30) Foreign Application Priority Data

Mar. 25, 2022 (WO) .................. PCT/JP2022/014678

(51) Int. Cl.
*G05B 19/042* (2006.01)
*B21B 38/00* (2006.01)
*G05B 23/02* (2006.01)

(52) U.S. Cl.
CPC .. *G05B 19/042* (2013.01); *G05B 2219/24215* (2013.01)

(58) Field of Classification Search
CPC ........ G05B 19/042; G05B 2219/24215; G05B 19/05; G05B 19/054; G05B 23/02; B21B 38/00
(Continued)

(56) References Cited

U.S. PATENT DOCUMENTS

2016/0147183 A1* 5/2016 Kanno ............... G03G 15/1675 399/66
2021/0191356 A1 6/2021 Fujieda et al.
2022/0390934 A1 12/2022 Higashiya et al.

FOREIGN PATENT DOCUMENTS

CN 103372573 A 10/2013
JP 2001-025805 A 1/2001
(Continued)

OTHER PUBLICATIONS

International Search Report and Written Opinion mailed on Jun. 7, 2022, received for PCT Application PCT/JP2022/014678, filed on Mar. 25, 2022, 14 pages including English Translation.
(Continued)

*Primary Examiner* — Michael J Brown
(74) *Attorney, Agent, or Firm* — XSENSUS LLP

(57) ABSTRACT

A SCADA web HMI system draws an HMI screen including a first material-to-be-rolled part arranged in a first zone and an extendable/contractible second material-to-be-rolled part arranged in a second zone. The first and second material-to-be-rolled parts are drawn at each drawing cycle shorter than a reception cycle of PLC signals. At each drawing cycle after a first PLC signal is received, a first material-to-be-rolled part head-end position is calculated based on a conveyance speed included in the first PLC signal and an elapsed time. A drawing size of the first material-to-be-rolled part is set to a length from an entry side of the first zone to the first material-to-be-rolled part head-end position. When a second PLC signal is received, the first material-
(Continued)

to-be-rolled part head-end position has not reached the second zone, the drawing size of the first material-to-be-rolled part is set to a zone length of the first zone.

10 Claims, 21 Drawing Sheets

(58) Field of Classification Search
USPC .............................................................. 700/9
See application file for complete search history.

(56) References Cited

FOREIGN PATENT DOCUMENTS

| | | | |
|---|---|---|---|
| JP | 2003-280732 | A | 10/2003 |
| JP | 2017-027211 | A | 2/2017 |
| WO | 2016/129081 | A1 | 8/2016 |
| WO | 2020/090027 | A1 | 5/2020 |
| WO | 2022/003818 | A1 | 1/2022 |

OTHER PUBLICATIONS

International Search Report and Written Opinion mailed on May 16, 2023, received for PCT Application PCT/JP2023/011286, filed on Mar. 22, 2023, 15 pages including English Translation.
Office Action issued on May 21, 2026, in corresponding Indian patent Application No. 202417006399, 10 pages.
Sun Xin et al., “Speed Cascade Control System for Bar and Wire Rod Mills”, ABB Value Paper, ABB China Ltd., Aug. 25, 2009, total 6 pages.

* cited by examiner

Fig. 3

SCREEN No.: G100

| ITEM NAME | DATA TYPE | COMMUNICATION ADDRESS |
|---|---|---|
| G100_1SLAB_M | BOOL | aaa |
| G100_1SLAB_HE | BOOL | bbb |
| G100_1SLAB_TE | BOOL | ccc |
| G100_1SLAB_SRF | REAL | ddd |
| G100_2SLAB_M | BOOL | eee |
| G100_2SLAB_HE | BOOL | fff |
| G100_2SLAB_TE | BOOL | ggg |
| G100_2SLAB_SRF | REAL | hhh |
| ... | ... | ... |

| Signals at first zone Z1 | |
|---|---|
| Presence flag | ON |
| Head-end presence flag | OFF |
| Tail-end presence flag | ON |

| Signals at second zone Z2 | |
|---|---|
| Presence flag | ON |
| Head-end presence flag | ON |
| Tail-end presence flag | OFF |

Head-end boundary line
→ Not draw

Tail-end boundary line
→ Not draw

Fig. 12(a) Position A

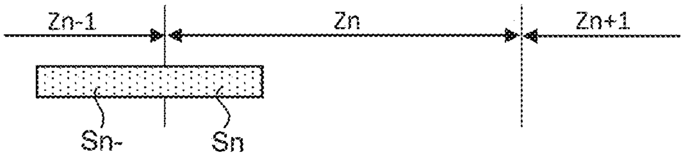

| Signals at zone Zn | |
|---|---|
| Presence flag | ON |
| Head-end presence flag | ON |
| Tail-end presence flag | OFF |

Fig. 12(b) Position B

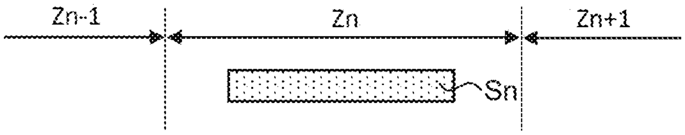

| Signals at zone Zn | |
|---|---|
| Presence flag | ON |
| Head-end presence flag | ON |
| Tail-end presence flag | ON |

Fig. 12(c) Position C

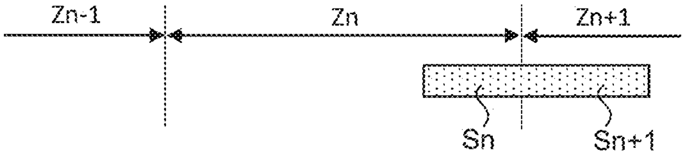

| Signals at zone Zn | |
|---|---|
| Presence flag | ON |
| Head-end presence flag | OFF |
| Tail-end presence flag | ON |

Fig. 12(d) Position D

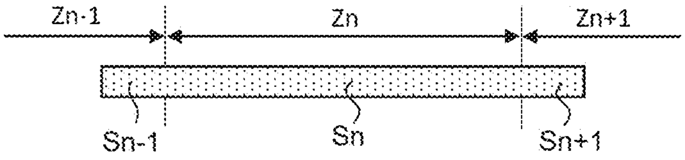

| Signals at zone Zn | |
|---|---|
| Presence flag | ON |
| Head-end presence flag | OFF |
| Tail-end presence flag | OFF |

| Signals at zone Zn | |
|---|---|
| Presence flag | ON |
| Head-end presence flag | ON |
| Tail-end presence flag | OFF |

| Signals at zone Zn | |
|---|---|
| Presence flag | ON |
| Head-end presence flag | OFF |
| Tail-end presence flag | ON |

| Signals at zone Zn | |
|---|---|
| Presence flag | ON |
| Head-end presence flag | ON |
| Tail-end presence flag | ON |

| Signals at zone Zn | |
|---|---|
| Presence flag | ON |
| Head-end presence flag | OFF |
| Tail-end presence flag | OFF |

| Signals at zone Zn | |
|---|---|
| Presence flag | ON (Long material Sa,Sb) |
| Head-end presence flag | OFF(Long material Sa)→ON(Long material Sb) |
| Tail-end presence flag | ON (Long material Sa) |

| Signals at zone Zn | |
|---|---|
| Presence flag | ON (Long material Sa,Sb) |
| Head-end presence flag | ON (Long material Sa) |
| Tail-end presence flag | OFF(Long material Sa)→ON(Long material Sb) |

| Signals at zone Zn | |
|---|---|
| Presence flag | ON (Long material Sa,Sb) |
| Head-end presence flag | ON (Long material Sb) |
| Tail-end presence flag | ON (Long material Sa) |

| Signals at zone Zn | |
|---|---|
| Presence flag | ON (Long material Sa,Sb) |
| Head-end presence flag | ON (Long material Sa) |
| Tail-end presence flag | ON (Long material Sb) |

Fig. 17(a)

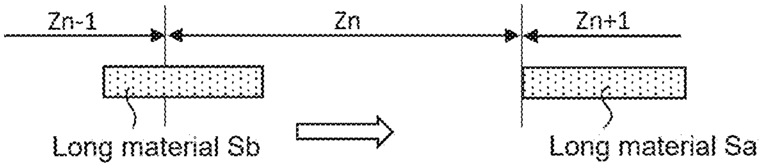

Rolling direction = Right direction
(Speed reference >0)

| Signals at zone Zn | |
|---|---|
| Presence flag | ON (Long material Sa) |
| Head-end presence flag | ON (Long material Sb) |
| Tail-end presence flag | ON (Long material Sa)→OFF |

Fig. 17(b)

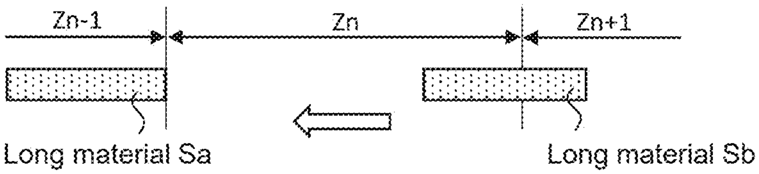

Rolling direction = Left direction
(Speed reference <0)

| Signals at zone Zn | |
|---|---|
| Presence flag | ON (Long material Sb) |
| Head-end presence flag | ON (Long material Sa)→OFF |
| Tail-end presence flag | ON (Long material Sb) |

SCADA WEB HMI SYSTEM

CROSS-REFERENCE TO RELATED APPLICATIONS

The present application is based on PCT filing PCT/JP2023/011286, filed Mar. 22, 2023, which claims priority from PCT filing PCT/JP2022/014678, filed Mar. 25, 2022, the entire contents of each are incorporated herein by reference.

FIELD

The present disclosure relates to a SCADA web HMI system.

BACKGROUND

A SCADA (Supervisory Control And Data Acquisition) is known as a mechanism for supervising and controlling a social infrastructure system. Social infrastructure systems include a steel rolling system, a power transmission and transformation system, a water and sewage treatment system, a building management system, and a road system.

The SCADA is a type of industrial control system, and performs system supervision and process control by a computer. The SCADA requires quick responsiveness (real-time property) corresponding to processing performance of the system.

The SCADA generally includes the following sub-systems.

(1) HMI (Human Machine Interface)

An HMI is a mechanism that presents data on an object process (supervisory object device) to an operator, and enables the operator to supervise and control the process. For example, PTL 1 discloses a SCADA HMI including an HMI screen operating on a SCADA client.

(2) Supervisory Control System

A supervisory control system collects signal data (PLC signal) on the process, and transmits a control command (control signal) to the process. The supervisory control system includes a Programmable Logic Controller (PLC).

(3) Remote Input/Output Device (Remote Input Output)

A remote input/output device is connected to a sensor installed in the process, converts a signal of the sensor into digital data, and transmits the digital data to the supervisory control system.

(4) Communication Infrastructure

A communication infrastructure connects the supervisory control system and the remote input/output device.

CITATION LIST

Patent Literature

[PTL 1] JP 2017-27211 A

SUMMARY

Technical Problem

One of the above-described steel rolling systems is a hot rolling line. The hot rolling line includes rolling mills (roughing mill and finishing mill) each including a plurality of rolling stands for rolling a material to be rolled. In an existing SCADA HMI, the rolling stands are displayed on the HMI screen, and presence/absence of the material to be rolled in each zone between the rolling stands is displayed by using two values (ON and OFF) when a PLC signal is received from the PLC.

However, the actual material to be rolled is conveyed from an upstream side to a downstream side of the hot rolling line with time. Therefore, it is desirable to track and display a head-end position and a tail-end position of the actual material to be rolled moving in each zone, on the HMI screen.

In particular, in a case where the signal from the PLC is transmitted at a low cycle (200 msec to 1000 msec), it is desirable to estimate the head-end position and the tail-end position of the material to be rolled and to display a tracking state on the HMI screen without waiting for a reception cycle of the PLC signal.

The present disclosure is made to solve the above-described issues, and an object of the present disclosure is to provide a SCADA web HMI system that can track a head-end (and tail-end) position of a material to be rolled on an HMI screen with high accuracy without waiting for a reception cycle of a PLC signal, and can correct tracking display on the HMI screen in a case where a latest PLC signal is received.

Solution to Problem

A first aspect relates to a SCADA web HMI system.

The SCADA web HMI system receives PLC signals from a PLC at each reception cycle.

The SCADA web HMI system comprises at least one processor and at least one monitor.

The processor is configured as follows.

The processor draws on the monitor an HMI screen, the HMI screen including an extendable/contractible first material-to-be-rolled part arranged in a first zone of a conveyance table for conveying a material to be rolled, and an extendable/contractible second material-to-be-rolled part arranged in a second zone adjacent to the first zone. Here, the first material-to-be-rolled part and the second material-to-be-rolled part are drawn at each drawing cycle shorter than the reception cycle.

The processor calculates a first material-to-be-rolled part head-end position based on a conveyance speed included in a first PLC signal and an elapsed time from reception of the first PLC signal, at each drawing cycle after the first PLC signal including a timing when a head-end of the material to be rolled enters the first zone and the conveyance speed of the material to be rolled is received.

The processor sets a drawing size of the first material-to-be-rolled part to a length from an entry side of the first zone to the first material-to-be-rolled part head-end position.

The processor sets the drawing size of the first material-to-be-rolled part to a zone length of the first zone, in a case where, when a second PLC signal including a timing when the head-end of the material to be rolled enters the second zone and the conveyance speed of the material to be rolled is received after the first PLC signal is received, the first material-to-be-rolled part head-end position has not reached the second zone.

The processor calculates a second material-to-be-rolled part head-end position based on the conveyance speed included in the second PLC signal and an elapsed time from reception of the second PLC signal at each drawing cycle after the second PLC signal is received.

The processor sets a drawing size of the second material-to-be-rolled part to a length from an entry side of the second zone to the second material-to-be-rolled part head-end position.

A second aspect further includes the following characteristics in addition to the first aspect.

The processor updates the first material-to-be-rolled part head-end position by adding a distance based on the conveyance speed included in a first intermediate PLC signal and an elapsed time from reception of the first intermediate PLC signal, to the first material-to-be-rolled part head-end position at a time when the first intermediate PLC signal is received, in a case where the first intermediate PLC signal including the conveyance speed is received during a period after the first PLC signal is received until the second PLC signal is received.

The processor sets the drawing size of the first material-to-be-rolled part to a length from the entry side of the first zone to the first material-to-be-rolled part head-end position.

A third aspect further includes the following characteristics in addition to the first or second aspect.

The processor calculates a first material-to-be-rolled part tail-end position based on the conveyance speed included in a third PLC signal and an elapsed time from reception of the third PLC signal, at each drawing cycle after the third PLC signal including a timing when a tail-end of the material to be rolled enters the first zone and the conveyance speed of the material to be rolled is received.

The processor sets the drawing size of the first material-to-be-rolled part to a length from the first material-to-be-rolled part tail-end position to an exit side of the first zone.

The processor sets the drawing size of the first material-to-be-rolled part to zero in a case where, when a fourth PLC signal including a timing when the tail-end of the material to be rolled enters the second zone and the conveyance speed of the material to be rolled is received after the third PLC signal is received, the first material-to-be-rolled part tail-end position has not reached the second zone.

The processor calculates a second material-to-be-rolled part tail-end position based on the conveyance speed included in the fourth PLC signal and an elapsed time from reception of the fourth PLC signal at each drawing cycle after the fourth PLC signal is received.

The processor sets the drawing size of the second material-to-be-rolled part to a length from the second material-to-be-rolled part tail-end position to an exit side of the second zone.

A fourth aspect further includes the following characteristics in addition to the third aspect.

The processor updates the first material-to-be-rolled part tail-end position by adding a distance based on the conveyance speed included in a third intermediate PLC signal and an elapsed time from reception of the third intermediate PLC signal, to the first material-to-be-rolled part tail-end position at a time when the third intermediate PLC signal is received, in a case where the third intermediate PLC signal including the conveyance speed is received during a period after the third PLC signal is received until the fourth PLC signal is received.

The processor sets the drawing size of the first material-to-be-rolled part to a length from the first material-to-be-rolled part tail-end position to the exit side of the first zone.

A fifth aspect further includes the following characteristics in addition to any one of the first to fourth aspects. The processor draws the first material-to-be-rolled part at an initial position in the first zone designated by the received first PLC signal.

A sixth aspect further includes the following characteristics in addition to any one of the first to fifth aspects. The first PLC signal includes a presence flag, a head-end presence flag, and a tail-end presence flag respectively indicating presence/absence of the first material-to-be-rolled part, a head end of the first material-to-be-rolled part, and a tail end of the first material-to-be-rolled part in the first zone. The processor transits a display state of the first material-to-be-rolled part in the first zone based on values of the presence flag, the head-end presence flag, and the tail-end presence flag.

A seventh aspect further includes the following characteristics in addition to any one of the first to sixth aspects. The processor erases, after the head end of the material to be rolled enters the second zone, a head-end boundary line of the first material-to-be-rolled part positioned at a boundary between the first zone and the second zone, and a tail-end boundary line of the second material-to-be-rolled part positioned at the boundary.

An eighth aspect further includes the following characteristics in addition to any one of the first to seventh aspects. The processor stereoscopically draws the first material-to-be-rolled part and the second material-to-be-rolled part as rectangular parallelepipeds. The processor, when a length of each of the rectangular parallelepipeds in a conveyance direction is changed, develops and decomposes the rectangular parallelepiped to rectangles, changes a length in the conveyance direction while the rectangular parallelepiped is decomposed to the rectangles, and applies affine transformation to each of the rectangle corresponding to a top surface of the rectangular parallelepiped and the rectangle corresponding to a tail-end surface of the rectangular parallelepiped in the conveyance direction, thereby generating the top surface and the tail-end surface each having a parallelogram.

A ninth aspect further includes the following characteristics in addition to the eighth aspect. The processor erases, after the head end of the material to be rolled enters the second zone, a head-end boundary surface as a head-end surface in the conveyance direction of the first material-to-be-rolled part positioned at a boundary between the first zone and the second zone, and a tail-end boundary surface as a tail-end surface of the second material-to-be-rolled part positioned at the boundary.

A tenth aspect further includes the following characteristics in addition to any one of the first to ninth aspects.

The material to be rolled is a long material to be rolled by a tandem rolling mill.

Each of the first zone and the second zone is a zone between rolling stands of the tandem rolling mill.

An eleventh aspect further includes the following characteristics in addition to any one of the first to tenth aspects.

The processor is configured to execute a web browser.

The web browser draws the HMI screen at each drawing cycle.

Advantageous Effects of Invention

According to the present disclosure, it is possible to track the head-end (and tail-end) position of the material to be rolled on the HMI screen with high accuracy without waiting for the reception cycle of the PLC signal, and to correct the tracking display on the HMI screen in a case where a latest PLC signal is received.

BRIEF DESCRIPTION OF DRAWINGS

FIG. 3 is a diagram to explain a device list according to the embodiment.

FIGS. 12(*a*), 12(*b*), 12(*c*) and 12(*d*) are diagrams to explain display positions of the long-material part.

FIGS. 17(*a*) and 17(*b*) are diagrams to explain display of the multi-slab state.

DESCRIPTION OF EMBODIMENTS

Figure 1:
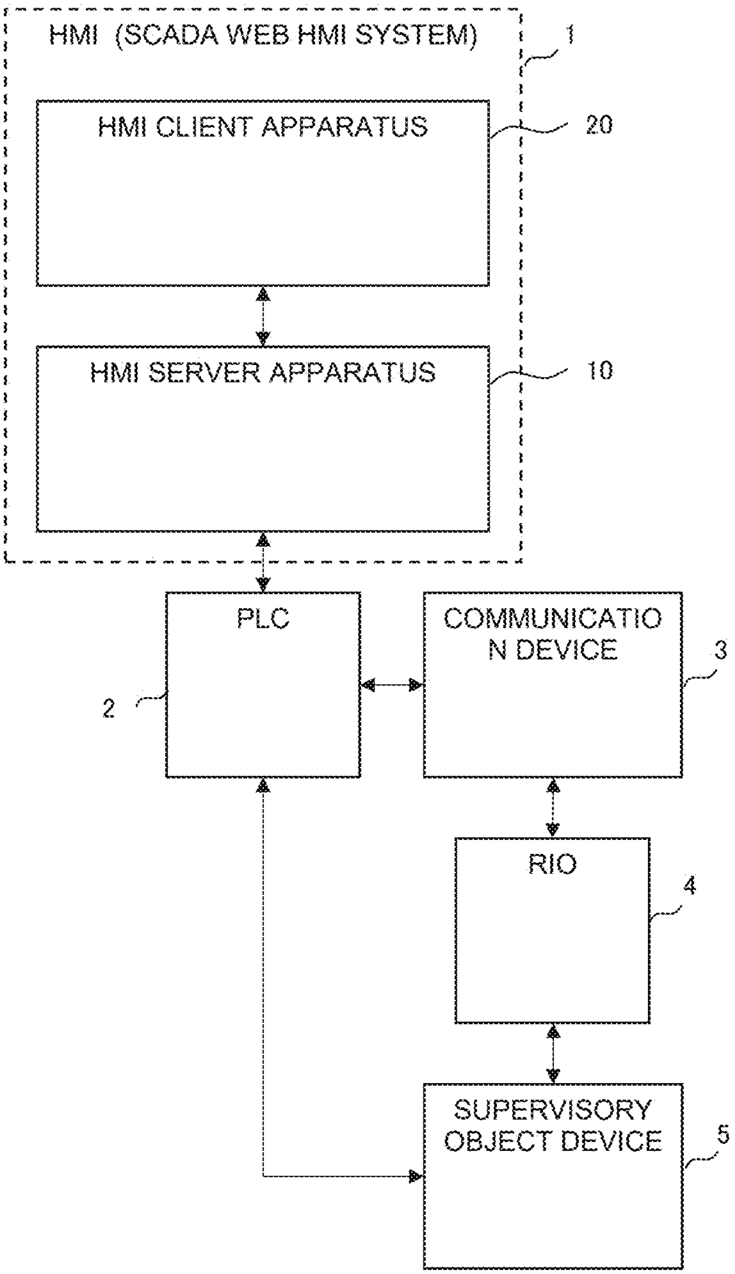
FIG. 1 is a diagram to explain a system configuration example of a SCADA according to an embodiment.

An embodiment of the present invention is described in detail below with reference to drawings. Note that elements common to the drawings are denoted by the same reference numerals, and repetitive descriptions are omitted.

Embodiment

1. Entire System

FIG. 1 is a diagram to explain a system configuration of a SCADA. The SCADA includes, as sub-systems, a human machine interface (HMI) 1, a programmable logic controller (PLC) 2 as a supervisory control system, a communication device 3 as a communication infrastructure, and an RIO 4. The SCADA is connected to a supervisory object device 5 through the PLC 2 or the RIO 4.

Descriptions of the PLC 2 (supervisory control system), the communication device 3 (communication infrastructure), and the RIO 4 are omitted because those are described in Background. The supervisory object device 5 is a sensor, an actuator, or the like configuring a plant to be supervised and controlled.

The HMI 1 (SCADA web HMI system) includes a SCADA web HMI server apparatus (hereinafter, referred to as HMI server apparatus 10), and at least one SCADA web HMI client apparatus (hereinafter, referred to as HMI client apparatus 20).

2. SCADA Web HMI System

The SCADA web HMI system is described with reference to FIG. 2.

The HMI server apparatus 10 is connected to the PLC 2 and the HMI client apparatus 20 through a computer network. The HMI server apparatus 10 transmits, to a web browser 21, update data (PLC signal) to update a display state of an HMI screen 22 in response to a signal received from the PLC 2. Further, the HMI server apparatus 10 receives a control signal from the web browser 21 and transmits the control signal to the PLC 2.

Figure 10:
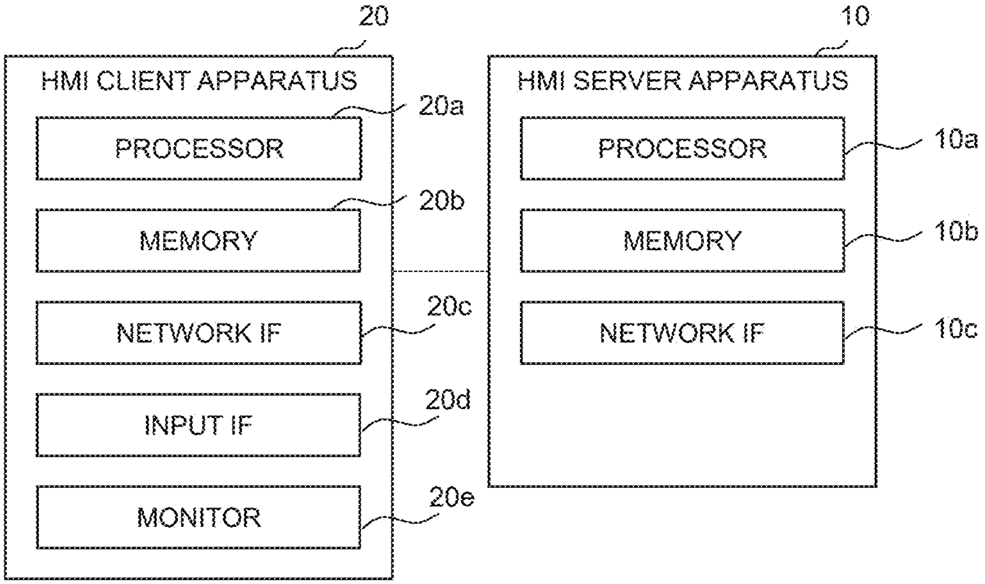
FIG. 10 is a block diagram illustrating hardware configuration examples of the HMI server apparatus and the HMI client apparatus according to the embodiment.

The HMI client apparatus 20 is a thin client not including a supervisory control logic, and includes at least one monitor 20*e* (FIG. 10). The HMI client apparatus 20 executes the web browser 21, and the web browser 21 is displayed in full screen on the monitor 20*e*. The web browser 21 communicates with the HMI server apparatus 10, and draws an HMI screen 22 in which parts displaying a state of the plant are arranged.

Figure 2:
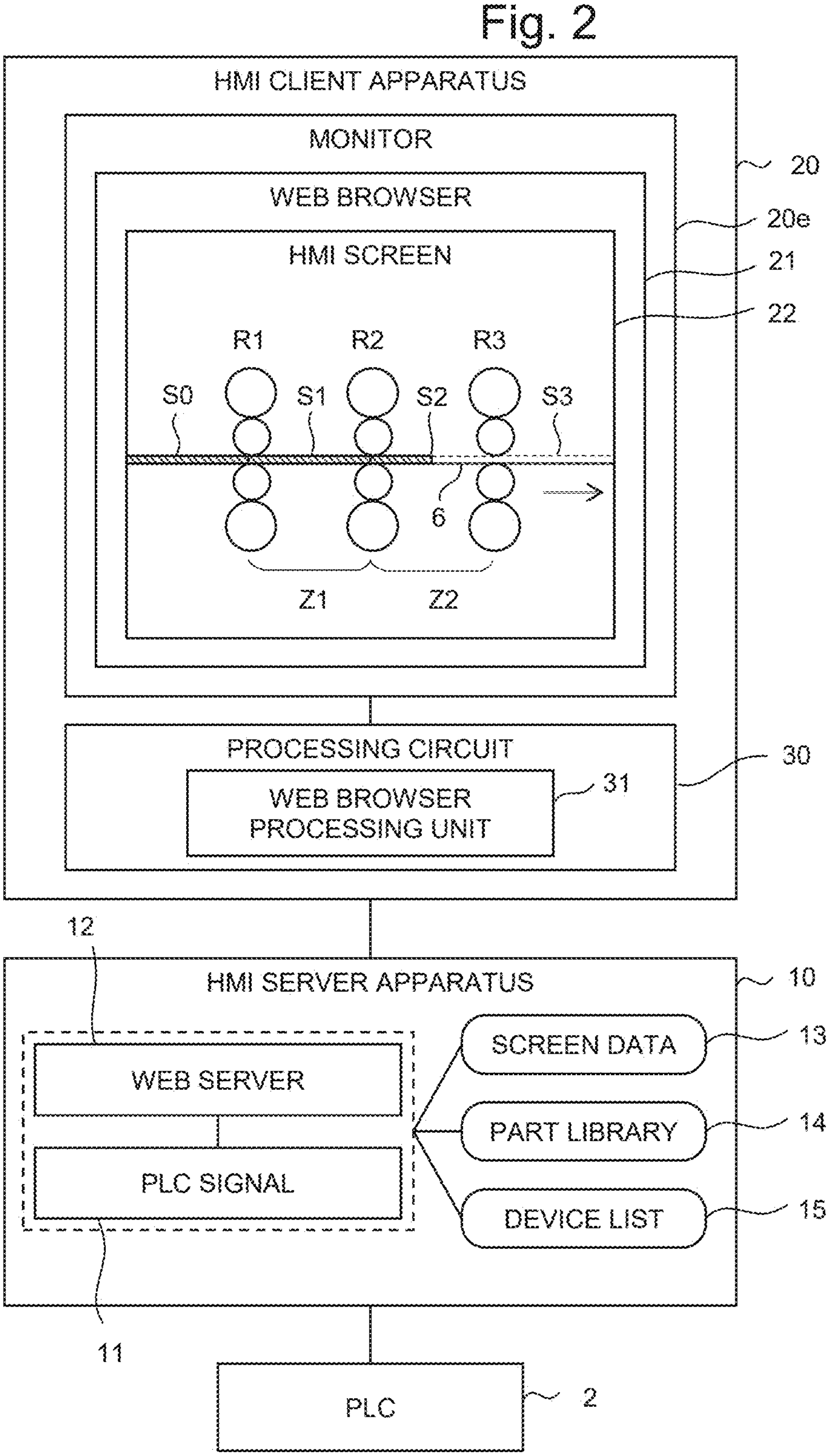
FIG. 2 is a block diagram illustrating overview of functions held by a SCADA web HMI system according to the embodiment.

The HMI screen 22 illustrated in FIG. 2 is described. The HMI screen 22 displays a tracking state of a material to be rolled in a rough rolling section of a hot rolling line. A roughing mill illustrated in FIG. 2 is a tandem rolling mill including three rolling stands (R1, R2, and R3) that are arranged in series. The roughing mill can roll the material to be rolled in a forward direction (upstream to downstream) and in a reverse direction (downstream to upstream).

The HMI screen 22 includes display parts indicating a first rolling stand R1, a second rolling stand R2, a third rolling stand R3, and a conveyance table 6 for conveying the long material which is the material to be rolled. In addition, the HMI screen 22 includes long-material parts (S0, S1, S2, and S3) that are material-to-be-rolled parts and that indicate a presence state of the material to be rolled and are freely extendable and contractible in display length in a longitudinal direction. The long-material part S0 is arranged on an upstream of the first rolling stand R1. The long-material part S1 is arranged in a zone (referred to as first zone Z1) between the first rolling stand R1 and the second rolling stand R2. The long-material part S2 is arranged in a zone (referred to as second zone Z2) between the second rolling stand R2 and the third rolling stand R3. The long-material part S3 is arranged on a downstream of the third rolling stand.

A long zone such as a rough rolling section and a finish rolling section is referred to as a macro-tracking zone, whereas a short zone (Z1 and Z2) between the rolling stands is referred to as a micro-tracking zone.

2-1. Configuration of SCADA Web HMI Server Apparatus

The HMI server apparatus 10 is described in more detail.

As illustrated in FIG. 10 described below, the HMI server apparatus 10 includes a processor 10*a* for performing various kinds of processing, and a memory 10*b* for storing various kinds of information (including programs). The various kinds of information include screen data 13, a part library 14, and a device list 15. The processor 10*a* functions as a PLC signal processing unit 11 and a web server processing unit 12 by reading the various kinds of information stored in the memory 10*b* and executing the programs. The PLC signal processing unit 11 and the web server processing unit 12 can mutually transmit and receive data through inter-process communication.

The screen data 13 is vector data defined for each HMI screen 22. For example, the vector data is data in a Scalable Vector Graphics (SVG) format. SVG data includes, as attributes of SVG elements, a part name, a shape, a position, a color, and a size of each of the parts arranged on the HMI screen 22. The screen data 13 includes a screen name.

For example, the screen data 13 on the HMI screen 22 illustrated in FIG. 2 includes the parts of the rolling stands (R1, R2, and R3), the part of the conveyance table 6, and the long-material parts (S0, S1, S2, and S3).

The part library 14 includes a set of scripts in which operation for each type of the parts arranged on the HMI screen 22 is described. Each of the scripts is a JavaScript® program defined for each type of the parts. Each of the scripts is given a parameter value as necessary, and can be executed on each web browser 21. For example, scripts of the long-material parts (S0, S1, S2, and S3) is given, as input values, a value of a presence flag, a value of a head-end presence flag, a value of a tail-end presence flag, a conveyance speed reference value, and a reception time of the PLC signal included in the PLC signal, and output drawing sizes (display lengths and display positions) of the long-material parts.

The presence flag is ON in a case where a part of the material to be rolled is present in the corresponding zone. The head-end presence flag is ON in a case where the head-end of the material to be rolled is present in the corresponding zone. The tail-end presence flag is ON in a case where the tail end of the material to be rolled is present in the corresponding zone. The values of the presence flag, the head-end presence flag, and the tail-end presence flag are calculated by the PLC 2 based on a sensor value of a rolling load sensor of each of the rolling stands and a sensor value of a laser sensor arranged near each of the rolling stands. The conveyance speed reference value is a conveyance speed of the material to be rolled, calculated by the PLC 2 based on a work roll rotation speed and a work roll diameter of each of the rolling stands.

The device list 15 is data defined for each HMI screen 22, and is, for example, data in a Comma-Separated Values (CSV) format. The device list 15 is data in which an item name associated with each of the parts arranged on the HMI screen 22 is associated with a communication address of the PLC. The item names and the communication addresses are unique in the system.

FIG. 3 is a diagram illustrating a part of the device list 15 relating to the HMI screen 22 illustrated in FIG. 2. "G100" is a screen number. A part name of the first long-material part S1 that is arranged in "G100" and displays the presence state in the first zone Z1 is "G100_1SLAB". Four tracking items are set to the first long-material part S1. Names of the items are "G100_1SLAB_M", "G100_1SLAB_HE", "G100_1SLAB_TE", and "G100_1SLAB_SRF". "G100_1SLAB_M" is a presence flag of the first zone Z1, and a data type thereof is a Boolean data type. "G100_1SLAB_HE" is a head-end presence flag of the first zone Z1, and a data type thereof is a Boolean data type. "G100_1SLAB_TE" is a tail-end presence flag of the first zone Z1, and a data type thereof is a Boolean data type. "G100_1SLAB_SRF" is a conveyance speed reference of the first zone Z1, and a data type thereof is a real data type.

A part name of the second long-material part S2 that is arranged in "G100" and displays the presence state in the second zone Z2 is "G100_2SLAB". Four tracking items are set to the second long-material part S2. Names of the items are "G100_2SLAB_M", "G100_2SLAB_HE", "G100_2SLAB_TE", and "G100_2SLAB_SRF". "G100_2SLAB_M" is a presence flag of the second zone Z2, and a data type thereof is a Boolean data type. "G100_2SLAB_HE" is a head-end presence flag of the second zone Z2, and a data type thereof is a Boolean data type. "G100_2SLAB_TE" is a tail-end presence flag of the second zone Z2, and a data type thereof is a Boolean data type. "G100_2SLAB_SRF" is a conveyance speed reference of the second zone Z2, and a data type thereof is a real data type.

Referring back to FIG. 2, the description is continued.

The PLC signal processing unit 11 periodically receives the PLC signal from the PLC 2 based on the communication address included in the device list 15, and transmits the PLC signal to the web server processing unit 12. The reception cycle of the PLC signal is a low cycle (about 200 msec to about 1000 msec). Further, the PLC signal processing unit 11 transmits the control signal received from the web server processing unit 12 to the PLC 2.

The web server processing unit 12 can communicate the web browser 21 (web browser processing unit 31) of the HMI client apparatus 20 by using HTTP (Hypertext Transfer Protocol), HTTPS (Hypertext Transfer Protocol Secure), and WebSocket. The web server processing unit 12 generates contents for each HMI screen based on the screen data 13 (SVG file) for each HMI screen, the part library 14 in which operation for each type of the parts is described, and the device list 15. The contents include an HTML file, the screen data 13 (SVG file), and the part library 14. The web server processing unit 12 transmits the contents in response to a request from the web browser 21 (web browser processing unit 31). The web server processing unit 12 receives the PLC signal from the PLC signal processing unit 11. The web server processing unit 12 transmits the PLC signal (value of item name corresponding to PLC signal) to the web browser 21 displaying the HMI screen 22 including the item name corresponding to the received PLC signal, based on the device list 15.

2-2. Configuration of SCADA Web HMI Client Apparatus

The HMI client apparatus 20 is described in more detail.

The HMI client apparatus 20 includes a processing circuit 30 (including processor 20*a* for performing various kinds of processing and memory 20*b* for storing various kinds of information (including programs) illustrated in FIG. 10 described below), and the monitor 20*e*. The processor 20*a* functions as the web browser processing unit 31 by reading the various kinds of information stored in the memory 20*b* and executing the programs.

The web browser processing unit 31 is performed for each web browser 21. The web browser 21 draws the HMI screen 22 to supervise and control an industrial plant. A plurality of parts are arranged on the HMI screen 22. The parts include, for example, an operation part to transmit the control signal to the PLC 2 in response to operation by an operator, and a display part that changes in display state (numerical value, characters, color, and shape) in response to the received PLC signal.

At startup, the web browser processing unit 31 receives the above-described contents (HTML file, screen data 13, and part library 14) from the web server processing unit 12, and stores the contents in the memory 20*b*. The web browser 21 draws the HMI screen 22 in which the parts are arranged, based on the contents.

The web browser processing unit 31 executes the script for each type of the parts included in the above-described part library 14, based on the type of each of the parts arranged on the HMI screen 22. In the present embodiment, the scripts of the long-material parts (S0, S1, S2, and S3) are described. The scripts of the long-material parts change drawing sizes of the long-material parts in response to input values based on the received corresponding PLC signals (values of above-described four tracking items and reception times of PLC signals).

3. Processing of Characteristically Drawing Long-Material Part

Processing of drawing the long-material parts according to the present embodiment is described with reference to FIG. 4 to FIG. 9. To simplify the description, in the following description, the extendable/contractible first long-material part S1 arranged in the first zone Z1 in FIG. 2, and the extendable/contractible second long-material part S2 arranged in the second zone Z2 adjacent to the first zone Z1 are described as examples. The first long-material part S1 and the second long-material part S2 are normally drawn at a drawing cycle sufficiently shorter than the reception cycle of the PLC signal; however, the drawing cycle is not constant because the drawing cycle is varied depending on a load state of the browser.

First, characteristics of drawing of the head-ends of the first long-material part S1 and the second long-material part S2 arranged on the HMI screen 22 are described with reference to FIG. 4.

FIG. 4(A) is a diagram to explain continuous drawing of the first long-material part S1 after a first PLC signal including a timing when the head-end of the material to be rolled enters the first zone Z1 and the conveyance speed reference value of the material to be rolled is received.

The web browser processing unit 31 calculates a first long-material part head-end position H1 based on the conveyance speed reference value included in the first PLC signal and an elapsed time from reception of the first PLC signal, at each drawing cycle after the first PLC signal is received. The web browser processing unit 31 sets a drawing size of the first long-material part S1 to a length from an entry side of the first zone Z1 to the first long-material part head-end position H1. The web browser processing unit 31 draws the first long-material part S1 in a range from the entry side of the first zone Z1 to the first long-material part head-end position H1 with a lighting color, and draws the first long-material part S1 in a range from the first long-material part head-end position H1 to an exit side of the first zone Z1 with a lighting-off color.

As a result, although the PLC signal is received at a low cycle (200 msec to 1000 msec), the head-end of the first long-material part S1 can be advanced toward the exit side of the first zone Z1 every time the drawing cycle arrives without waiting for the next PLC signal, which makes it possible to smoothly display the tracking state of the material to be rolled.

However, as illustrated in FIG. 4(B), there may be a case where the first long-material part head-end position H1 has not reached the second zone Z2 when a second PLC signal including a timing when the head-end of the material to be rolled enters the second zone Z2 and the conveyance speed reference value of the material to be rolled is received after the first PLC signal is received. In this case, the head-end position of the first long-material part S1 drawn on the HMI screen 22 has not caught up with the head-end position of the actual material to be rolled.

In this case, the web browser processing unit 31 immediately sets the drawing size (display length) of the first long-material part S1 to a zone length (100%) of the first zone (FIG. 4(C)). The web browser processing unit 31 draws the first long-material part S1 in the range from the entry side of the first zone Z1 to the first long-material part head-end position H1 (exit side of first zone Z1) with the lighting color.

This makes it possible to cause the head-end position of the first long-material part S1 drawn on the HMI screen 22 to catch up with the head-end position of the actual material to be rolled.

Thereafter, as illustrated in FIG. 4(D), the web browser processing unit 31 calculates a second long-material part head-end position H2 based on the conveyance speed reference value included in the second PLC signal and an elapsed time from reception of the second PLC signal, at each drawing cycle after the second PLC signal is received. The web browser processing unit 31 sets a drawing size of the second long-material part S2 to a length from an entry side of the second zone Z2 to the second long-material part head-end position H2. The web browser processing unit 31 draws the second long-material part S2 in a range from the entry side of the second zone Z2 to the second long-material part head-end position H2 with the lighting color, and draws the second long-material part S2 in a range from the second long-material part head-end position H2 to an exit side of the second zone Z2 with the lighting-off color.

As a result, although the PLC signal is received at a low cycle, the head-end of the second long-material part S2 can be advanced toward the exit side of the second zone Z2 every time the drawing cycle arrives without waiting for the next PLC signal, which makes it possible to smoothly display the tracking state of the material to be rolled.

Next, characteristics of drawing of the tail-ends of the first long-material part S1 and the second long-material part S2 arranged on the HMI screen 22 are described with reference to FIG. 5.

FIG. 5(A) is a diagram to explain continuous drawing of the first long-material part S1 after a third PLC signal including a timing when the tail-end of the material to be rolled enters the first zone Z1 and the conveyance speed reference value of the material to be rolled is received.

The web browser processing unit 31 calculates a first long-material part tail-end position T1 based on the conveyance speed reference value included in the third PLC signal and an elapsed time from reception of the third PLC signal, at each drawing cycle after the third PLC signal is received. The web browser processing unit 31 sets the drawing size of the first long-material part S1 to the length from the first long-material part tail-end position T1 to the exit side of the first zone Z1. The web browser processing unit 31 draws the first long-material part S1 in a range from the entry side of the first zone Z1 to the first long-material part tail-end position T1 with the lighting-off color, and draws the first long-material part S1 in a range from the first long-material part tail-end position T1 to the exit side of the first zone Z1 with the lighting color.

As a result, although the PLC signal is received at a low cycle, the tail-end of the first long-material part S1 can be advanced toward the exit side of the first zone Z1 every time the drawing cycle arrives without waiting for the next PLC signal, which makes it possible to smoothly display the tracking state of the material to be rolled.

However, as illustrated in FIG. 5(B), there may be a case where the first long-material part tail-end position T1 has not reached the second zone Z2 when a fourth PLC signal including a timing when the tail-end of the material to be rolled enters the second zone Z2 and the conveyance speed reference value of the material to be rolled is received after the third PLC signal is received. In this case, the tail-end position of the first long-material part S1 drawn on the HMI screen 22 has not caught up with the tail-end position of the actual material to be rolled.

In this case, the web browser processing unit 31 immediately sets the drawing size (display length) of the first long-material part S1 to zero (FIG. 5(C)). The web browser processing unit 31 draws the first long-material part S1 in a range from the entry side to the exit side of the first zone Z1 with the lighting-off color.

This makes it possible to cause the tail-end position of the first long-material part S1 drawn on the HMI screen 22 to catch up with the tail-end position of the actual material to be rolled.

Thereafter, as illustrated in FIG. 5(D), the web browser processing unit 31 calculates a second long-material part tail-end position T2 based on the conveyance speed reference value included in the fourth PLC signal and an elapsed time from reception of the fourth PLC signal, at each drawing cycle after the fourth PLC signal is received. The web browser processing unit 31 sets the drawing size of the second long-material part S2 to a length from the second long-material part tail-end position T2 to the exit side of the second zone Z2. The web browser processing unit 31 draws the second long-material part S2 in a range from the entry side of the second zone Z2 to the second long-material part tail-end position T2 with the lighting-off color, and draws the second long-material part S2 in a range from the second long-material part tail-end position T2 to the exit side of the second zone Z2 with the lighting color.

As a result, although the PLC signal is received at a low cycle, the tail-end of the second long-material part S2 can be advanced toward the exit side of the second zone Z2 every time the drawing cycle arrives without waiting for the PLC signal, which makes it possible to smoothly display the tracking state of the material to be rolled.

Figure 4:
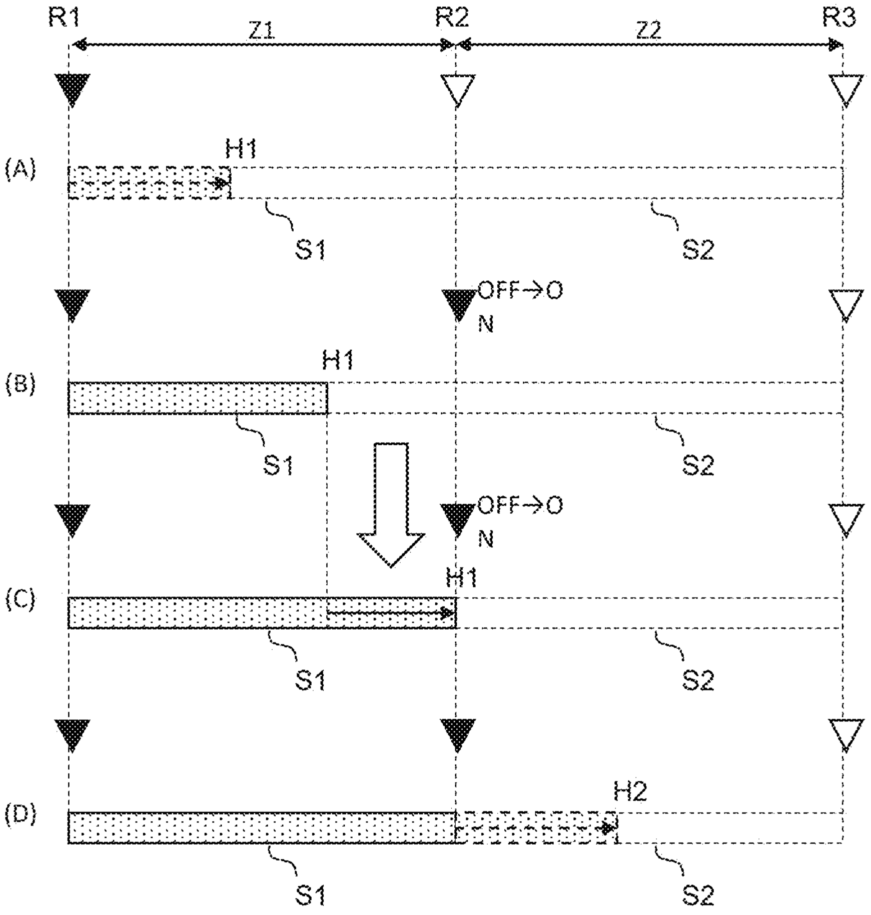
FIG. 4 is a flowchart to explain characteristics of drawing of a head-end of a long-material part arranged on a HMI screen according to the embodiment.
Figure 5:
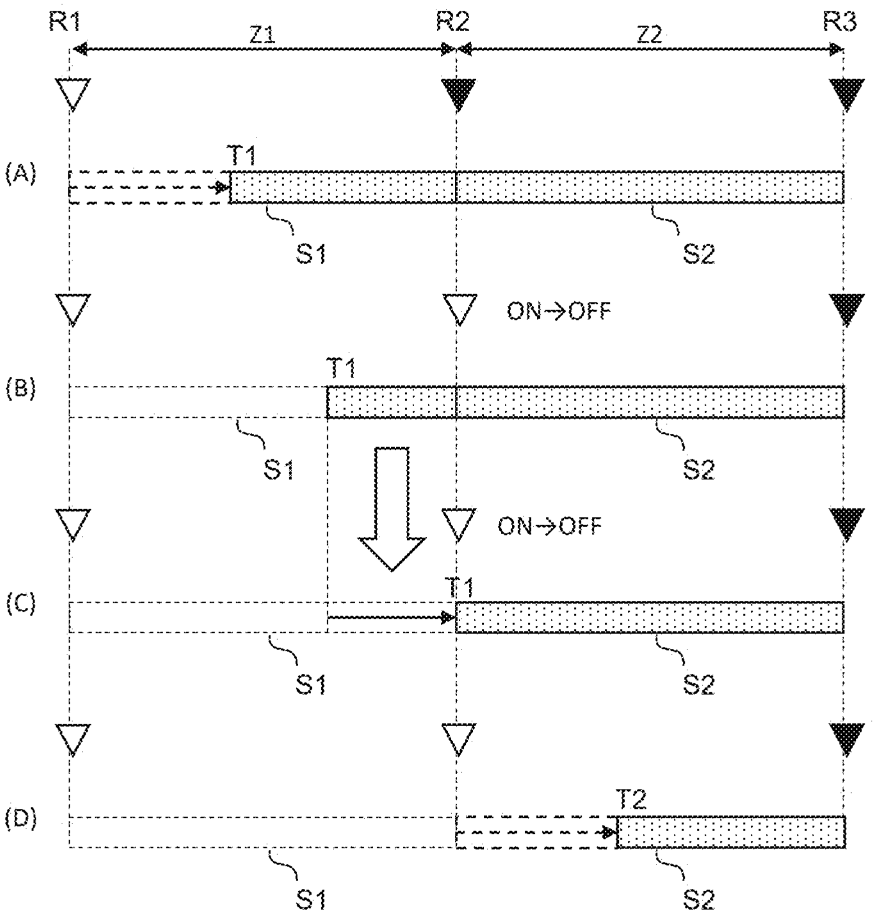
FIG. 5 is a flowchart to explain characteristics of drawing of a tail-end of the long-material part arranged on the HMI screen according to the embodiment.

In FIG. 4 and FIG. 5 described above, the PLC signal that may be received during a period after the first PLC signal (or third PLC signal) including the timing when the head-end (or tail-end) of the material to be rolled enters the first zone Z1 is received until the second PLC signal including the timing when the head-end (or tail-end) of the material to be rolled enters the second zone Z2 (exits from the first zone Z1) is received, is not described in order to simplify the description. However, a plurality of PLC signals (referred to as intermediate PLC signals) may be actually received during the period after the first PLC signal is received until the second PLC signal is received. The intermediate PLC signals are PLC signals different in conveyance speed reference value from the first PLC signal (or third PLC signal).

To enhance tracking accuracy, the web browser processing unit 31 integrates an in-zone moving distance of the head-end (or tail-end) of the material to be rolled in consideration of the latest conveyance speed reference value included in the intermediate PLC signal, thereby calculating the position of the head-end (or tail-end) of the long-material part.

More specifically, as for the first zone Z1, in a case where the web browser processing unit 31 receives a first intermediate signal including the conveyance speed reference value during the period after the first PLC signal is received until the second PLC signal is received, the web browser processing unit 31 updates the first long-material part head-end position H1 by adding a distance based on the conveyance speed reference value included in the first intermediate PLC signal and an elapsed time from reception of the first intermediate PLC signal, to the first long-material part head-end position H1 at a time when the first intermediate PLC signal is received. The web browser processing unit 31 sets the drawing size of the first long-material part S1 to the length from the entry side of the first zone Z1 to the first long-material part head-end position H1.

Likewise, in a case where the web browser processing unit 31 receives a third intermediate PLC signal including the conveyance speed reference value during the period after the third PLC signal is received until the fourth PLC signal is received, the web browser processing unit 31 updates the first long-material part tail-end position T1 by adding a distance based on the conveyance speed reference value included in the third intermediate PLC signal and an elapsed time from reception of the third intermediate PLC signal, to the first long-material part tail-end position T1 at a time when the third intermediate PLC signal is received. The web browser processing unit 31 sets the drawing size of the first long-material part S1 to a length from the first long-material part tail-end position T1 to the exit side of the first zone Z1.

Figure 6:
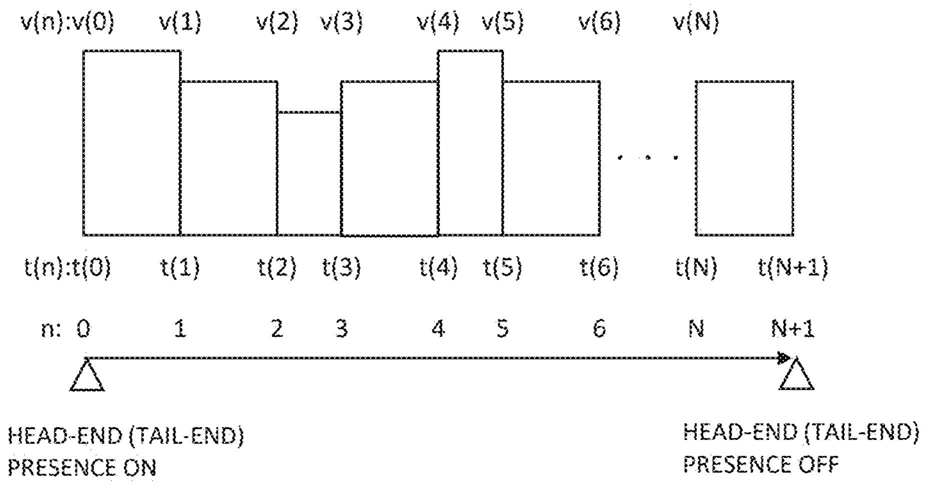
FIG. 6 is a diagram to explain integration of in-zone moving distance according to the embodiment.

FIG. 6 is a diagram to explain the integration of the in-zone moving distance in the micro-tracking zone.

In FIG. 6, n is the number of changing times of speed, t(n) is a time, t(0) is a head-end (tail-end) presence ON time [sec], t(N+1) is a head-end (tail-end) presence OFF time [sec], and v(n) is the conveyance speed reference value [m/sec]. As illustrated in FIG. 6, n PLC signals are received until the head-end (tail-end) passes through the first zone Z1. In each of the PLC signals, the conveyance speed reference value may be changed. An in-zone moving distance P(N) [m] is represented by the following expression (1).

[Math. 1]

$$P(N)=\sum_{n=0}^{N}\{t(n+1)-t(n)\}v(n) \tag{1}$$

Figure 7:
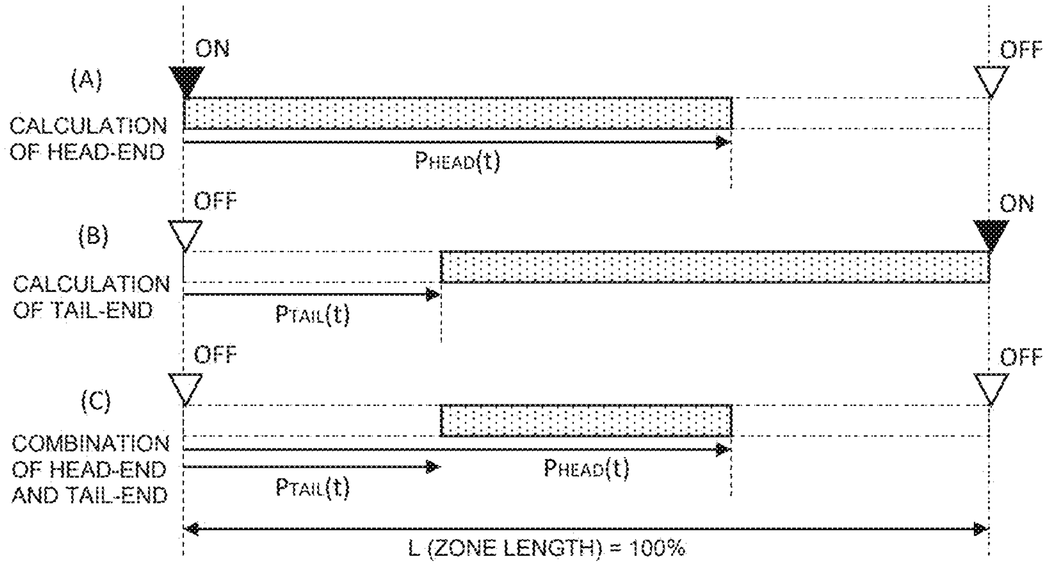
FIG. 7 is a diagram illustrating positions of the head-end and the tail-end of the long-material part based on the in-zone moving distance according to the embodiment.

FIG. 7 is a diagram illustrating the head-end position and the tail-end position of the long-material part based on the in-zone moving distance P(N). FIG. 7(A) is a diagram illustrating a head-end moving distance $P_{HEAD}$(t) of the long-material part calculated by using the expression (1). FIG. 7(B) is a diagram illustrating a tail-end moving distance $P_{TAIL}$(t) of the long-material part calculated by using the expression (1). FIG. 7(C) is a diagram illustrating the head-end moving distance $P_{HEAD}$(t) and the tail-end moving distance $P_{TAIL}$(t) of the long-material part calculated by using the expression (1). A ratio of a display length to a maximum length (zone length L [m]) of the long-material part in FIG. 7(C) is represented by the following expression (2).

[Math. 2]

$$\frac{P_{HEAD}-P_{TAIL}}{L}\times 100[\%] \tag{2}$$

Figure 8:
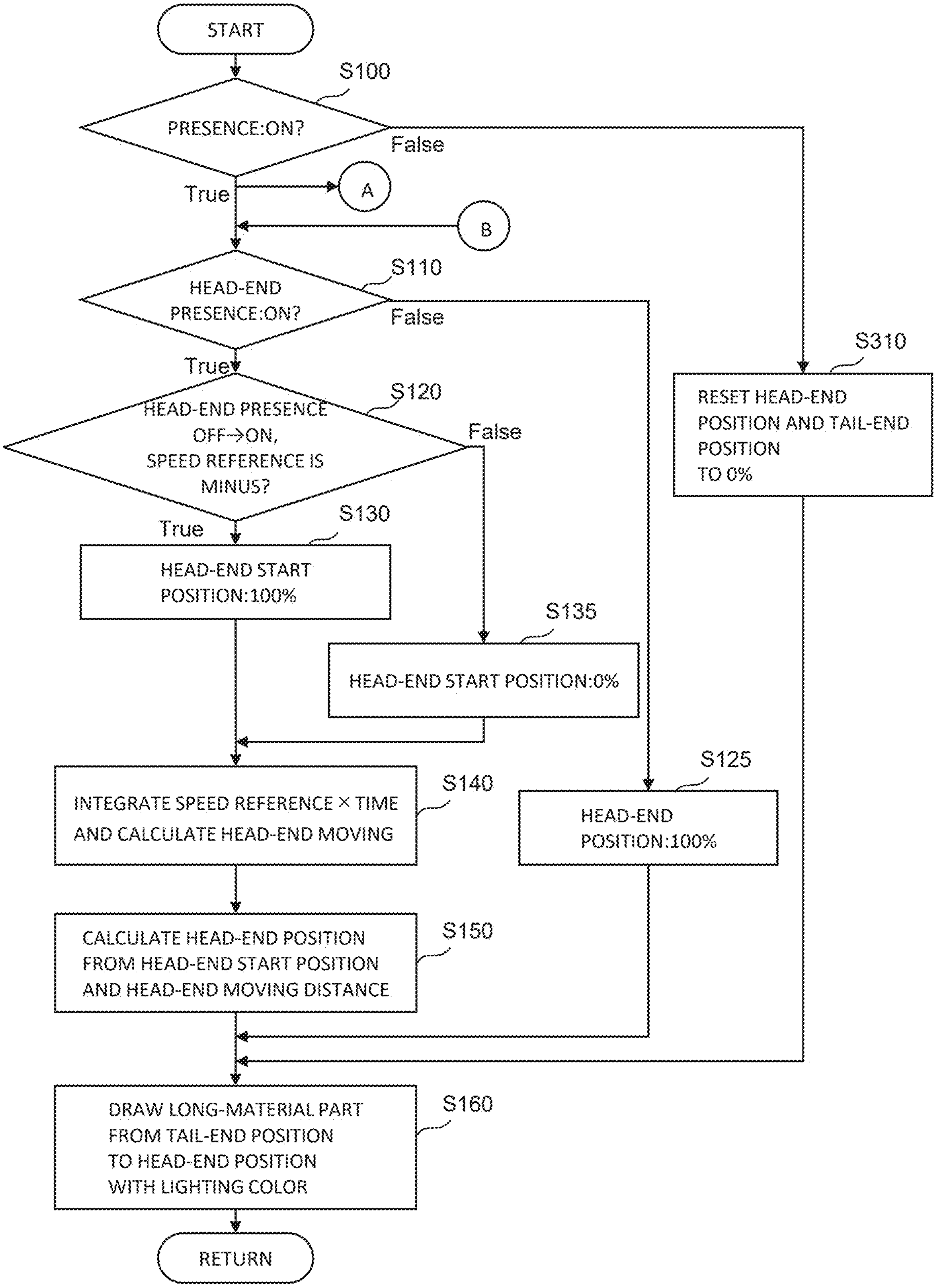
FIG. 8 is a flowchart to explain a processing of drawing the long-material part according to the embodiment.

Next, the processing of drawing the long-material part according to the present embodiment is described with reference to flowcharts illustrated in FIG. 8 and FIG. 9. The processing illustrated in the flowcharts is performed on each of the long-material parts of the zones at each drawing cycle. The drawing cycle is normally sufficiently shorter than the PLC reception cycle; however, the drawing cycle is not constant because the drawing cycle is varied depending on the load state of the browser.

First, in step S100, the web browser processing unit 31 determines whether the presence flag included in the latest received PLC signal is ON or OFF. In a case where a part of the material to be rolled is present in the corresponding zone, the presence flag is ON. In a case where the presence flag is ON, processing in step S110 is performed. In a case where the presence flag is OFF, processing in step [S310] S155 is performed. As an example, the presence flag is "G100_1SLAB_M" of the first zone Z1 or "G100_2SLAB_M" of the second zone Z2 described above (FIG. 3).

In step S110, the web browser processing unit 31 determines whether the head-end presence flag included in the latest PLC signal is ON or OFF. In a case where the head-end of the material to be rolled is present in the corresponding zone, the head-end presence flag is ON. In a case where the head-end presence flag is ON, processing in step S120 is performed. In a case where the head-end presence flag is OFF, the head-end position is set to 100% in step S125, and then processing in step S160 is performed.

In step S120, the web browser processing unit 31 determines whether the head-end presence flag is switched from OFF to ON in the latest PLC signal and whether the conveyance speed reference value included in the latest PLC signal is a minus value. In a case where the conveyance speed reference value is a minus value, reverse rolling is performed, and the material to be rolled is rolled from the downstream side toward the upstream side of the rolling line. In a case where the determination condition in step S120 is established, processing in step S130 is performed. In a case where the determination condition is not established, a head-end start position is set to 0% in step S135, and then processing in step S140 is performed.

In the case where the determination condition in step S120 is established, namely, in a case where the head-end of the material to be rolled enters the corresponding zone from the downstream side of the rolling line during the reverse rolling, the head-end start position of the corresponding zone is set to 100% of the maximum length (zone length) of the long-material part in step S130. Thereafter, processing in step S140 is performed.

In step S140, the web browser processing unit 31 integrates the conveyance speed reference value×the time based on each of the PLC signals received after the head-end presence flag is switched to ON until the present time, thereby calculating the head-end moving distance of the long-material part (expression (1)).

Next, in step S150, the web browser processing unit 31 calculates the head end position of the long-material part from the head-end start position and the head-end moving distance. As an example, the first long-material part head-end position H1 in the first zone Z1 illustrated in FIG. 4 is calculated.

Next, in step S160, the web browser processing unit 31 draws the long-material part only from the tail-end position to the head-end position with the lighting color on the HMI screen 22 (FIG. 7(C)). For example, in the zone where the head-end of the material to be rolled is present, the long-material part from the entry side of the zone to the long-material part head-end position is drawn with the lighting color (FIG. 7(A)). In the zone where the tail-end of the material to be rolled is present, the long-material part from the long-material part tail-end position to the exit side of the zone is drawn with the lighting color (FIG. 7(B)). Further, in the zone where the presence flag is ON but neither the head-end nor the tail-end of the material to be rolled is present, the long-material part from the entry side to the exit side of the zone is displayed with the lighting color. Note that, in the zone where the presence flag is OFF, the long-material part from the entry side to the exit side of the zone is displayed with the lighting-off color.

In the case where the presence flag is OFF in step S100 described above, processing in step S310 is performed. In step S310, the web browser processing unit 31 resets the head-end position and the tail-end position of the long-material part in the zone where the presence flag is OFF, to 0%. Thereafter, processing in step S160 described above is performed.

Figure 9:
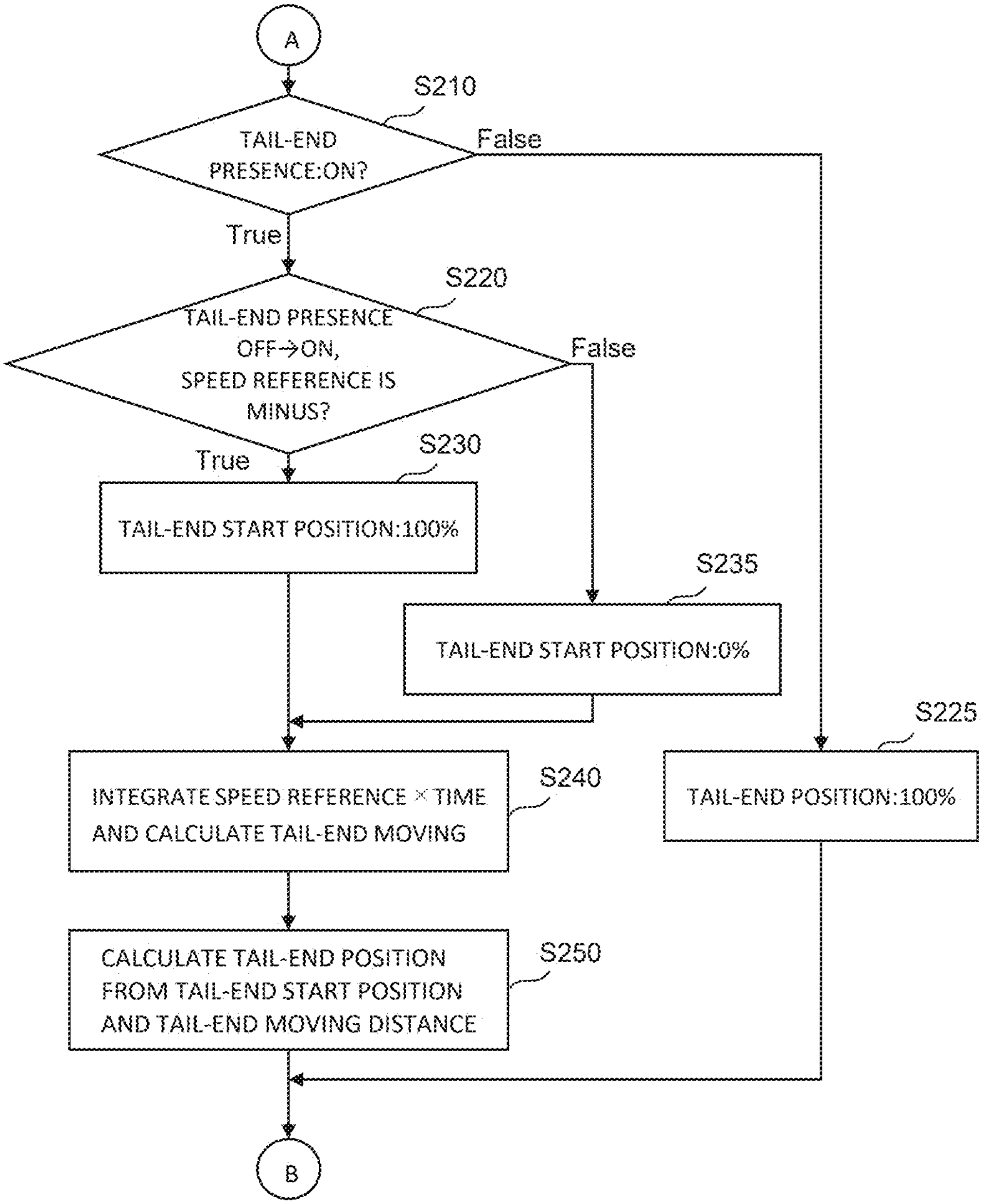
FIG. 9 is a flowchart to explain a processing of drawing the long-material part according to the embodiment.

Further, in the case where the presence flag is ON in step S100 described above, processing in step S210 illustrated in FIG. 9 is performed.

In step S210, the web browser processing unit 31 determines whether the tail-end presence flag included in the latest PLC signal is ON or OFF. In a case where the tail-end of the material to be rolled is present in the corresponding zone, the tail-end presence flag is ON. In a case where the tail-end presence flag is ON, processing in step S220 is performed. In a case where the tail-end presence flag is OFF, the tail-end position is set to 100% in step S225, and then the processing returns to the routine in FIG. 8.

In step S220, the web browser processing unit 31 determines whether the tail-end presence flag included in the latest PLC signal is switched from OFF to ON and whether the conveyance speed reference value included in the latest PLC signal is a minus value. In the case where the conveyance speed reference value is a minus value, the reverse rolling is performed, and the material to be rolled is rolled from the downstream side to the upstream side of the rolling line. In a case where the determination condition in step S220 is established, processing in step S230 is performed. In a case where the determination condition is not established, a tail-end start position is set to 0% in step S235, and then processing in step S240 is performed.

In the case where the determination condition in step S220 is established, namely, in a case where the tail-end of the material to be rolled enters the corresponding zone from the downstream side of the rolling line during the reverse rolling, the tail-end start position of the corresponding zone is set to 100% of the maximum length (zone length) of the long-material part in step S230. Thereafter, processing in step S240 is performed.

In step S240, the web browser processing unit 31 integrates the conveyance speed reference value×the time based on each of the PLC signals received after the tail-end presence flag is switched to ON until the present time, thereby calculating the tail-end moving distance of the long-material part (expression (1)).

Next, in step S250, the web browser processing unit 31 calculates the tail-end position of the long-material part from the tail-end start position and the tail-end moving distance. As an example, the first long-material part tail-end position T1 in the first zone Z1 illustrated in FIG. 5 is calculated. Thereafter, the processing returns to the routine in FIG. 8.

4. Effects

As described above, the system according to the present embodiment estimates the head-end (and tail-end) position of the material to be rolled and changes the drawing size of the long-material part at each drawing cycle that is shorter than the reception cycle of the PLC signal. This makes it possible to track the head-end (and tail-end) position of the material to be rolled on the HMI screen with high accuracy without waiting for the reception cycle of the PLC signal. In addition, in a case where the latest PLC signal is received, it is possible to correct the tracking display on the HMI screen.

5. Modifications

In the system according to the above-described embodiment, the material to be rolled that is a steel material such as a slab and a strip is exemplified as a specific example of the long-material part; however, the shape of the material to be rolled may be a rod shape, a wire shape, a sheet shape, or the like, and a material of the material to be rolled may be a resin, paper, or the like. Further, the zone is not limited to a zone between the rolling stands of the roughing mill, and may be a zone between the rolling stands of the finishing mill, a zone between rolls of a looper, or the like. Further, the zone is not limited to the zone in the rolling line.

In the system according to the above-described embodiment, the SCADA web HMI system includes the HMI server apparatus 10 and the HMI client apparatus 20; however, the system configuration is not limited thereto. For example, the SCADA web HMI system may include a single device for performing both of the server function and the client function.

In the system according to the above-described embodiment, the HMI screen 22 is drawn in the web browser 21; however, the HMI screen 22 may be drawn in the monitor 20*e* without through the web browser 21.

In the system according to the above-described embodiment, the parts displayed on the HMI screen 22 are two-dimensionally drawn; however, the parts may be three-dimensionally drawn.

6. Hardware Configuration Example

FIG. 10 is a block diagram illustrating a hardware configuration example of the HMI server apparatus 10 and the HMI client apparatus 20.

The processing of the above-described HMI server apparatus 10 is realized by a processing circuit. The processing circuit includes the processor 10*a*, the memory 10*b*, and a network interface 10*c* that are connected to one another. The processor 10*a* realizes the functions of the HMI server apparatus 10 by executing various kinds of programs stored in the memory 10*b*. The memory 10*b* includes a main storage device and an auxiliary storage device. The memory 10*b* previously stores the screen data 13, the part library 14, and the device list 15 all described above. The network interface 10*c* is a device that is connected to the PLC 2 and the HMI client apparatus 20 through a computer network, and can transmit/receive the PLC signal and the control signal.

The above-described processing of the HMI client apparatus 20 and below-described processing of the HMI client apparatus 20 are realized by a processing circuit. The processing circuit includes the processor 20*a*, the memory 20*b*, a network interface 20*c*, an input interface 20*d*, and at least one monitor 20*e* that are connected to one another. The processor 20*a* realizes the functions of the HMI client apparatus 20 by executing various kinds of programs stored in the memory 20*b*. The memory 20*b* includes a main storage device and an auxiliary storage device. The network interface 20*c* is a device that is connected to the HMI server apparatus 10 through the computer network, and can transmit/receive the PLC signal and the control signal. The input interface 20*d* includes input devices such as a keyboard, a mouse, and a touch panel. A plurality of monitors 20*e* may be provided. The HMI client apparatus 20 may be a mobile terminal such as a tablet.

7. Vertical Line Erasure Processing at Zone Boundary

As illustrated in FIG. 5(A), when the head end of the long-material part enters from the first zone Z1 to the second zone Z2, the long-material parts S1 and S2 are present across the first zone Z1 and the second zone Z2 in some cases. In this case, when head-end positions H1 and H2 and tail-end positions T1 and T2 of the long-material parts S1 and S1 are specified independently in each of the zones Z1 and Z2 (see FIG. 11), vertical lines are displayed at a portion of the long material positioned at a boundary between the first zone Z1 and the second zone Z2 (hereinafter, also referred to as "zone boundary") even though the long-material parts S1 and S2 are integrated. As illustrated by virtual lines in FIG. 11, a head-end boundary line $L_{HEAD}$ of the long-material part S1 and a tail-end boundary line $L_{TAIL}$ of the long-material part S2 are displayed as vertical lines at the zone boundary. The vertical lines do not actually exist and are unnecessary. Therefore, it is desirable to erase the vertical lines in order to improve presentation.

Figure 11:
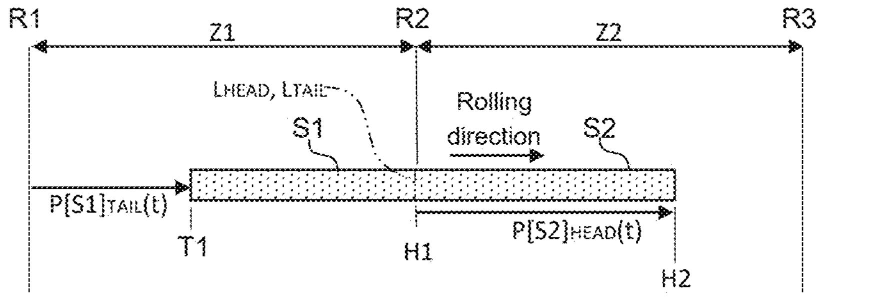
FIG. 11 is a diagram to explain vertical line erasure processing for erasing the vertical lines displayed at portions of the long-material parts positioned at zone boundary.

FIG. 11 is a diagram to explain vertical line erasure processing for erasing the vertical lines displayed at portions of the long-material parts S1 and S2 positioned at the zone boundary. As illustrated in FIG. 11, the tail end of the long-material part S1 is positioned in the first zone Z1. Therefore, the presence flag of the zone Z1 is ON, and the tail-end presence flag is ON. In a case where the presence flag is ON and the head-end presence flag is OFF, the web browser processing unit 31 does not draw the head-end boundary line of the long-material part S1 in the first zone Z1. Further, the head end of the long-material part S2 is positioned in the second zone Z2. Therefore, the presence flag of the second zone Z1 is ON, and the head-end presence flag is ON. In a case where the presence flag is ON, and the tail-end presence flag is OFF, the web browser processing unit 31 does not draw a tail-end boundary line of the long-material part S2 in the second zone Z2. By the vertical line erasure processing, the head-end boundary line and the tail-end boundary line that do not actually exist at the zone boundary are not drawn, in other words, the vertical lines are erased, which makes it possible to improve presentation to the operator.

8. Transition of Display State of Long-Material Part

[Position of Long-Material Part]

In a target zone Zn among three zones Zn−1, Zn, and Zn+1 continuously arranged along a rolling direction, four patterns illustrated in FIG. 12 are considered as a position of a long-material part Sn. Positions A to D can be associated with the presence flag, the head-end presence flag, and the tail-end presence flag. The positions A to D are independent of the rolling direction, and the rolling direction may be positive (right direction) or negative (left direction).

The position A illustrated in FIG. 12(*a*) corresponds to, for example, a case where the long material parts Sn and Sn−1 are moving from the previous zone Zn−1 to the zone Zn. At the position A, the presence flag and the head-end presence flag of the zone Zn are ON, and the tail-end presence flag is OFF. The position B illustrated in FIG. 12(*b*) corresponds to, for example, a case where the whole of the long-material part Sn is included in the zone Zn. At the position B, the presence flag, the head-end presence flag, and the tail-end presence flag of the zone Zn are all ON. The position C illustrated in FIG. 12(*c*) corresponds to, for example, a case where the long-material parts Sn and Sn−1 are moving from the zone Zn to the subsequent zone Zn+1. At the position C, the presence flag and the tail-end presence flag of the zone Zn are ON, and the head-end presence flag is OFF.

When the long material is rolled, the long material is elongated and present across the three zones Zn−1, Zn, and Zn+1 in some cases. Therefore, the position D illustrated in FIG. 12(*d*) is necessary. At the position D, the presence flag is ON, and the head-end presence flag and the tail-end presence flag are OFF.

[Long-Material Part Initial Position Setting Processing]

An initial position is a position where the long-material part Sn appears in the zone Zn for the first time, and is a display position at the time when the presence flag of the zone Zn is changed from OFF to ON. The initial position may be any of the positions A to D based on the values of the head-end presence flag and the tail-end presence flag at the time when the presence flag is changed from OFF to ON. After the long-material part Sn is displayed at the initial position, the long-material part Sn starts to move in the right direction or the left direction based on the speed reference value. In other words, the positions of the head end and the tail end of the long-material part Sn are tracked.

Figure 13A:
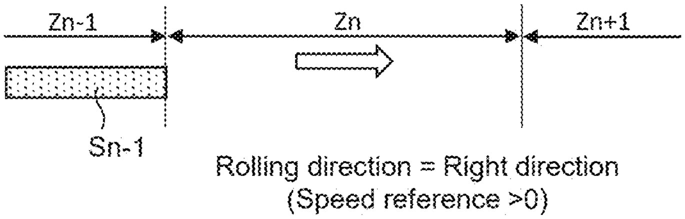
FIGS. 13(*a*) and 13(*b*) are diagrams to explain initial position setting processing of the long-material part.
Figure 13B:
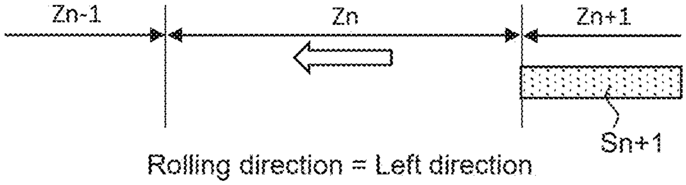

As illustrated in FIG. 13(*a*), a case where the initial position is the position A corresponds to a case where the head-end position of the long-material part moves in the right direction from the previous zone Zn−1. The speed reference value at this time is positive. The long-material part Sn displayed at the position A starts to move in the right direction based on the speed reference value. Note that in a case where the initial position is the position A and the speed reference value is negative, the presence flag of the zone Zn is OFF, and the long-material part Sn disappears.

As illustrated in FIG. 13(*b*), a case where the initial position is the position C corresponds to a case where the tail-end position of the long-material part returns leftward from the subsequent zone Zn+1. The speed reference value at this time is negative. The long-material part Sn displayed at the position C starts to move in the left direction based on the speed reference value. Note that in a case where the initial position is the position C and the speed reference value is positive, the presence flag of the zone Zn is OFF, and the long-material part Sn disappears.

Figure 14A:
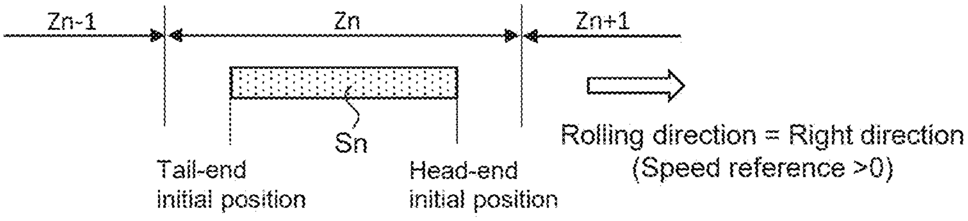
FIGS. 14(*a*) and 14(*b*) are diagrams to explain initial position setting processing of the long-material part.
Figure 14B:
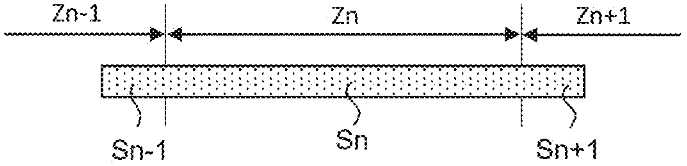

In the examples illustrated in FIG. 13(*a*) and FIG. 13(*b*), it is assumed that the long-material part Sn moves from a starting end to a terminal end of the zone Zn in the rolling direction. In the rough rolling section, for example, in a case where the speed reference is positive (rolling direction is right direction) as illustrated in FIG. 14(*a*), a slab as the long-material part extracted from a heating furnace is put at the optional position B other than the starting end of the zone Zn in the rolling direction in some cases. Therefore, the initial positions of the head end and the tail end (hereinafter, referred to as "head-end initial position" and "tail-end initial position") of the long-material part Sn in the zone Zn are previously designated by the PLC signal. The head-end initial position and the tail-end initial position are designated so as to satisfy a condition "0≤tail-end initial position<head-end initial position≤zone length L". The designated head-end initial position and the designated tail-end initial position may be fixed values or direct values from the PLC 2. The PLC signal may include information about an address, and the head-end initial position and the tail-end initial position may be read out from the address of the corresponding memory 20*b*.

[Display of Plurality of Long-Material Parts (Multi-Slab State)]

Figure 15A:
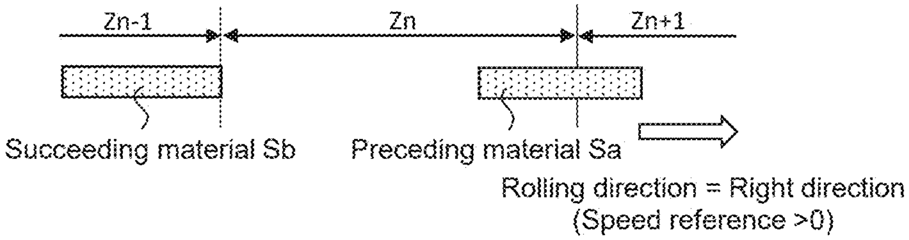
FIGS. 15(*a*) and 15(*b*) are diagrams to explain display of a multi-slab state.
Figure 15B:
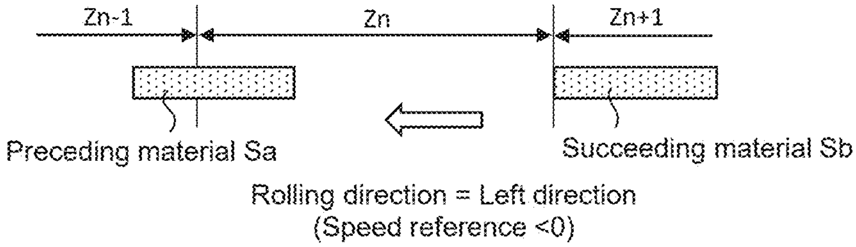
Figure 16A:
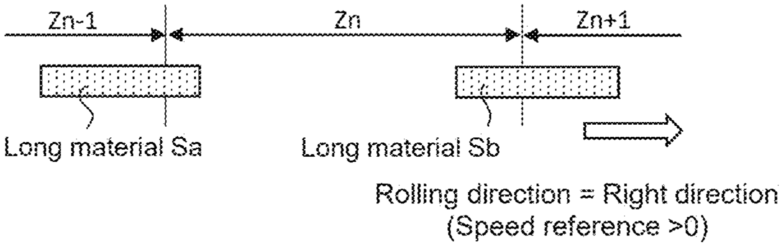
FIGS. 16(*a*) and 16(*b*) are diagrams to explain display of the multi-slab state.
Figure 16B:
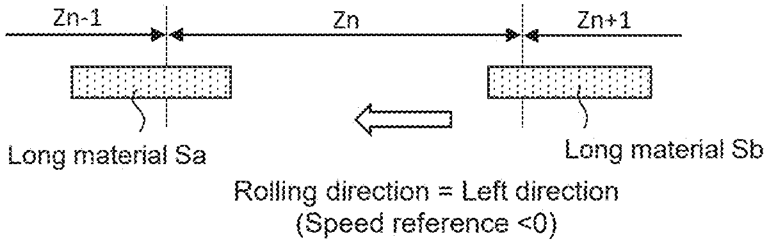

FIG. 15 to FIG. 17 are diagrams to explain display of a multi-slab state.

When a pitch between a preceding long-material part (hereinafter, referred to as "preceding material") and a succeeding long-material part (hereinafter, referred to as "succeeding material") in the rolling line is made narrow, productivity is increased. Further, the pitch between the preceding material and the succeeding material is made narrow by manual intervention by the operator in some cases.

In a case where the pitch is shorter than the length of the zone Zn as described above, a head end of a succeeding material Sb enters the zone Zn before a preceding material Sa completely moves through the zone Zn (while tail end of preceding material Sa is present in zone Zn) as illustrated in FIG. 15(*a*) and FIG. 15(*b*). As a result, two long-material parts (preceding part and succeeding part) Sa and Sb are present in one zone Zn. The state is referred to as a "multi-slab state". If the multi-slab state is not expected, integration (tracking) of the tail end of the preceding material Sa disappears when the succeeding material Sb enters the zone Zn. This deteriorates tracking accuracy of the preceding material Sa.

Thus, in the multi-slab state, the two long-material parts Sa and Sb are located at the position A and the position C. In other words, one or both of the long-material parts Sa and Sb are never located at the position B. This makes it possible to reduce each of the number of head-end presence flags and the number of tail-end presence flags in the zone Zn to one.

In a case where the speed reference is positive as illustrated in FIG. 15(*a*), when the head-end presence flag is changed to ON while the preceding material Sa is at the position C, it is regarded that the succeeding material Sb has entered the zone Zn, and the multi-slab state is displayed. When a predetermined time elapses after the state illustrated in FIG. 15(*a*), the state is changed to a state illustrated in FIG. 16(*a*). Thereafter, when the preceding material Sa leaves the zone Zn and the tail-end presence flag is changed to OFF as illustrated in FIG. 17(*a*), the multi-slab state is eliminated, and the succeeding material Sb is at the position A.

In a case where the speed reference is negative as illustrated in FIG. 15(*b*), when the tail-end presence flag is changed to ON while the preceding material Sa is at the position A, it is regarded that the succeeding material Sb has entered the zone Zn, and the multi-slab state is displayed. When a predetermined time elapses from the state illustrated in FIG. 15(*b*), the state is changed to a state illustrated in FIG. 16(*b*). Thereafter, when the preceding material Sa leaves the zone Zn and the head-end presence flag is changed to OFF as illustrated in FIG. 17(*b*), the multi-slab state is eliminated, and the succeeding material Sb is at the position C.

An accurate position of the material to be rolled is unclear, and only information indicating whether the material to be rolled is located in the zone by the tracking sensor is obtainable in some cases, for example, in a case where tracking is resumed. To cope with such a situation (to correct tracking), the position D is provided as the initial position.

Figure 18:
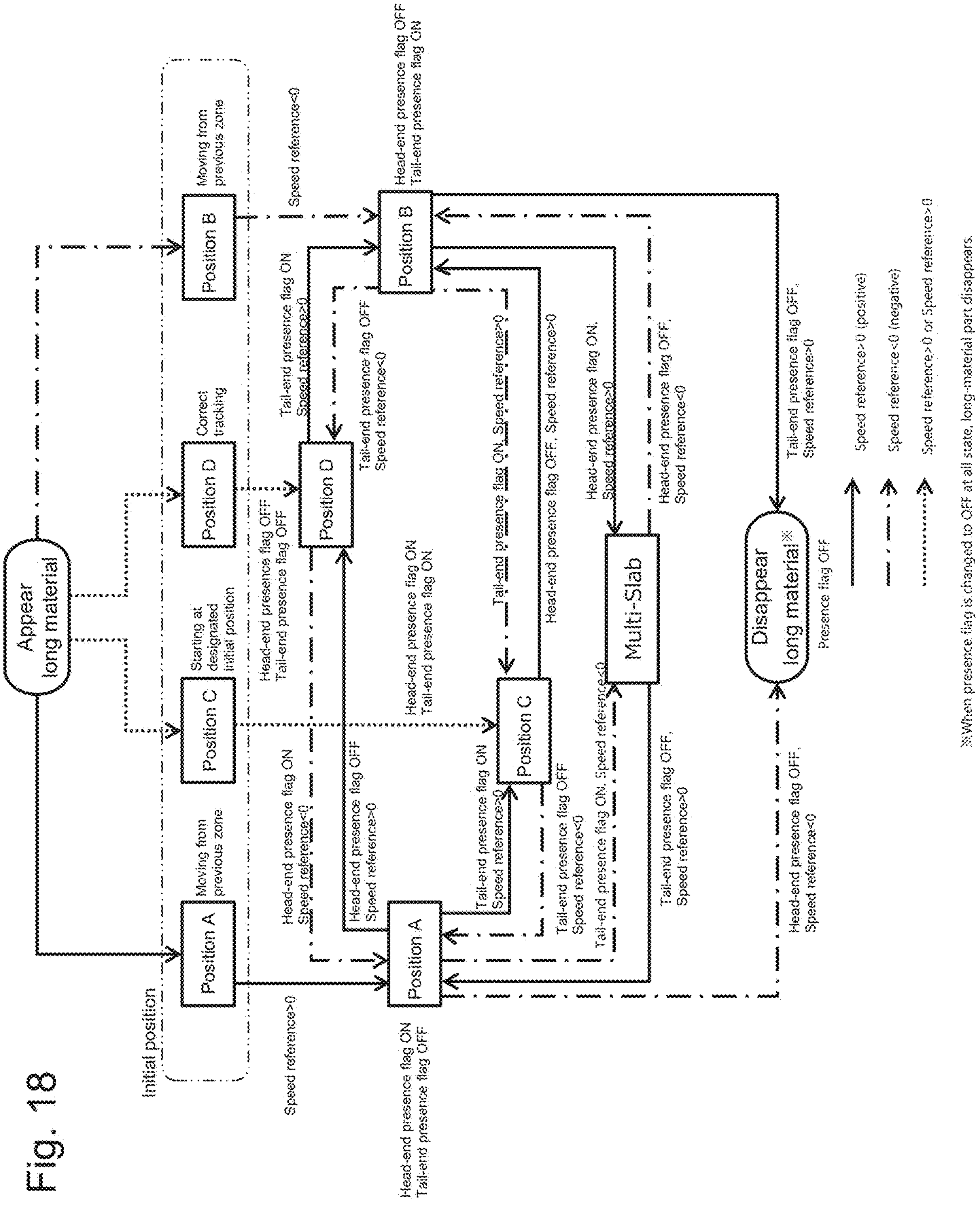
FIG. 18 is a diagram to explain transition of the display state of the long-material part.

FIG. 18 is a diagram to explain transition of the display state of the long-material part described above. As illustrated in FIG. 18, when the presence flag of the zone Zn is changed from OFF to ON, the long-material part Sn is displayed at the initial position that is any one of the position A to the position D, based on the speed reference, the head-end presence flag, and the tail-end presence flag. At this time, in a case where the head-end initial position and the tail-end initial position are designated, the long-material part Sn is displayed at the position C. In a case where tracking is corrected, the long-material part Sn is displayed at the position D.

After displayed at the initial position, the long-material part Sn starts to move in the right direction or the left direction based on the speed reference value. When the head-end presence flag or the tail-end presence flag is changed along with movement, the position of the long-material part Sn is changed among the positions A to D. In the case where the pitch between the preceding material Sa and the succeeding material Sb is narrow as illustrated in FIG. 15 to FIG. 17, the multi-slab state can be displayed. When the presence flag is changed to OFF, the long-material part Sn disappears. As described above, display of the long-material part Sn can be changed based on the speed reference, the head-end presence flag, and the tail-end presence flag. As a result, it is possible to perform tracking with high accuracy.

9. Stereoscopic Display Processing for Long-Material Part

Figure 19:
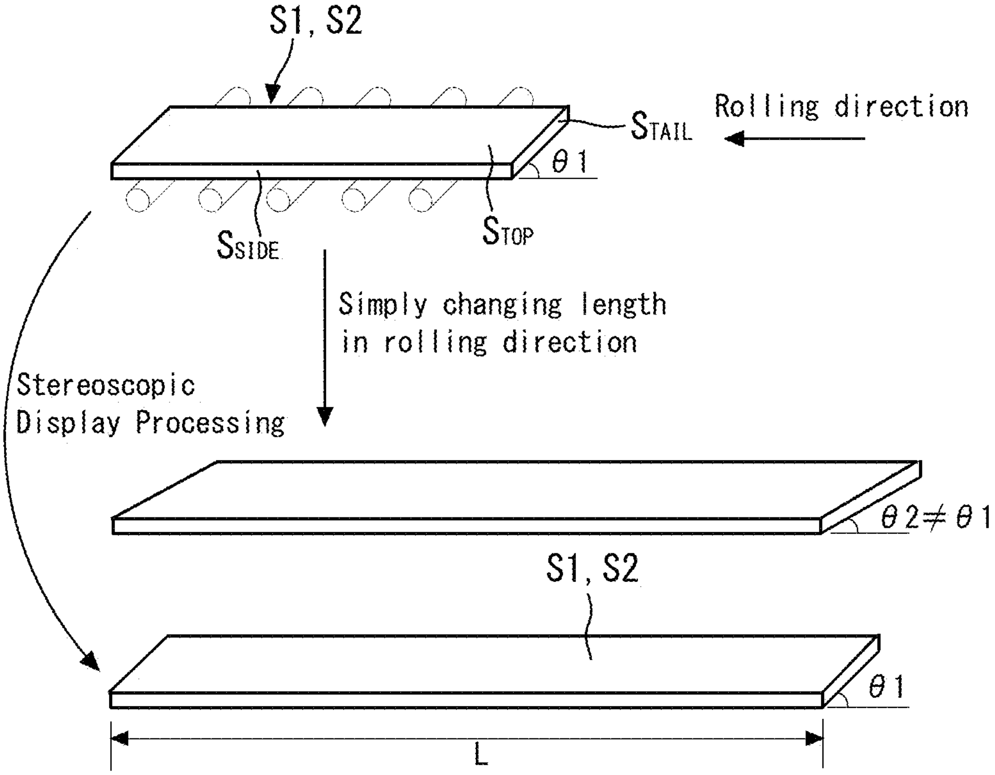
FIG. 19 is a diagram to explain stereoscopic display processing for the long-material part.
Figure 20A:
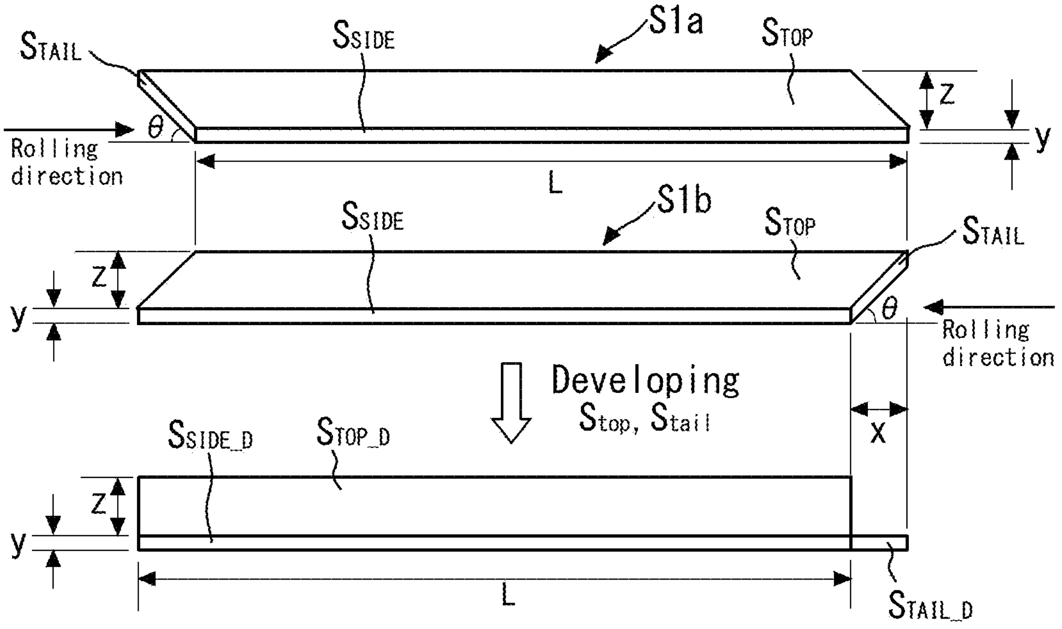
FIGS. 20(*a*), 20(*b*) and 20(*c*) are diagrams to explain stereoscopic display processing for the long-material part.
Figure 20B:
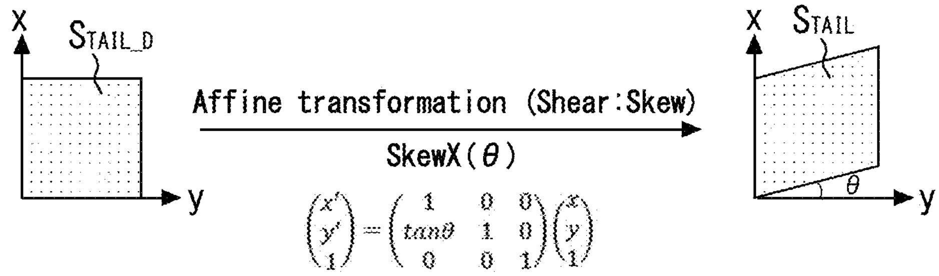
Figure 20C:
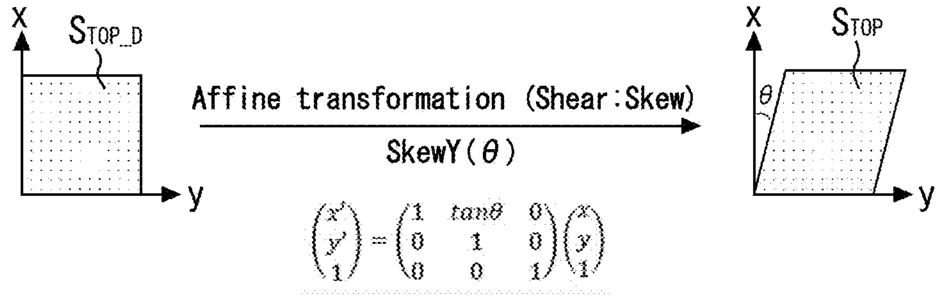

The above-described example is based on the premise that the long-material parts S1 and S2 are drawn in a planar manner (hereinafter, referred to as "plane display"). In the plane display, shapes of the long-material parts S1 and S2 are simple rectangular shapes because of being viewed from a width direction of the long material orthogonal to the rolling direction. In the screen display of the tracking zone, there is a case where it is desired to stereoscopically draw the long-material parts S1 and S2 (hereinafter, referred to as "stereoscopic display") on the rolling line as viewed from an oblique direction, in order to enable the operator to easily view the display. FIG. 19 and FIG. 20 are diagrams to explain stereoscopic display processing for the long-material parts S1 and S2. As illustrated in FIG. 19, in the stereoscopic display, the shape of each of the long-material parts S1 and S2 is, for example, a rectangular parallelepiped in which an inclination of each of a top surface $S_{TOP}$ and a tail-end surface $S_{TAIL}$ is an angle θ1. When the length in the rolling direction of each of the long-material parts S1 and S2 formed in such a rectangular parallelepiped is simply changed, the inclination of each of the top surface $S_{TOP}$ and the tail-end surface $S_{TAIL}$ is changed to an angle θ2. To enable the operator to easily view the display, the length L in the rolling direction of each of the long-material parts S1 and S2 is desirably changeable while the inclination of each of the top surface $S_{TOP}$ and the tail-end surface $S_{TAIL}$ is maintained.

In the stereoscopic display processing according to the present embodiment, two types of long-material parts Sla and S1*b* are prepared depending on the rolling direction as illustrated in FIG. 20(*a*). A length L, a height (thickness) y, a depth (plate width) z, and an inclination θ of each of the long-material parts S1*a* and S1*b* are freely changeable when the HMI screen 22 is created (designed) by an unillustrated engineering tool.

A case of using the long-material part S1*b* (case where rolling is performed from right to left) is described as an example. First, the top surface $S_{TOP}$ and the tail-end surface $S_{TAIL}$ of the long-material part S1*b* are developed (see FIG. 20(*a*)). By the development, the top surface $S_{TOP}$ and the tail-end surface $S_{TAIL}$ are decomposed into rectangles $S_{TOP\_D}$ and $S_{TAIL\_D}$ as base shapes for generating a rectangular parallelepiped. A length of a short side of the decomposed rectangle $S_{TOP\_D}$ is z. A length of a long side of the rectangle $S_{TAIL\_D}$ is x, and a length of a short side is y. In the developed state, the length L of the rectangle $S_{TOP\_D}$ in the rolling direction, and the length L of a rectangle $S_{SIDE\_D}$ corresponding to a side surface $S_{SIDE}$ in the rolling direction are changed. Change of the length L includes both expansion and contraction.

Thereafter, as illustrated in FIG. 20(*b*), affine transformation SkewX(θ) is applied to the rectangle $S_{TAIL\_D}$ to generate the tail-end surface $S_{TAIL}$ having a parallelogram. Likewise, as illustrated in FIG. 20(*c*), affine transformation SkewY(θ) is applied to the rectangle $S_{TOP\_D}$ to generate the top surface $S_{TOP}$ having a parallelogram. For simplification of illustration, the rectangles $S_{TOP\_D}$ and $S_{TAIL\_D}$ are illustrated as squares in FIG. 20(*b*) and FIG. 20(*c*). As a result, it is possible to change the length L in the rolling direction of each of the long-material parts S1 and S2 stereoscopically displayed while the inclinations of the top surface $S_{TOP}$ and the tail-end surface $S_{TAIL}$ are maintained.

10. Vertical Line Erasure Processing in Stereoscopic Display

Figure 21:
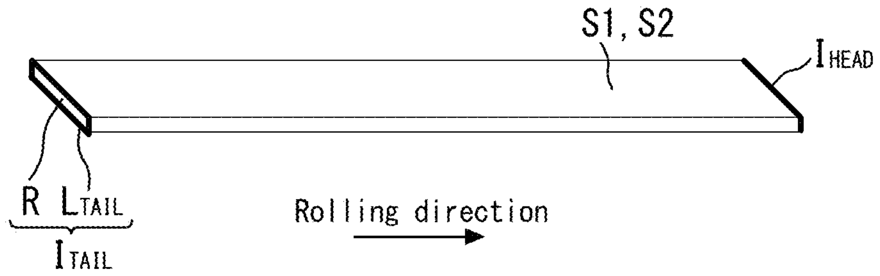
FIGS. 21(*a*) and 21(*b*) are diagrams to explain vertical line erasure processing in the case where the long-material part is stereoscopically displayed.
Figure 21:
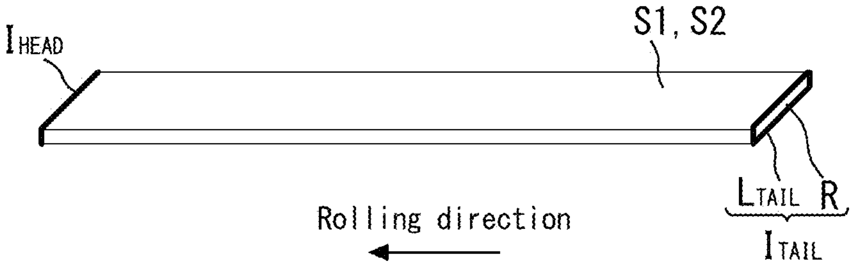

In the case where the long-material parts S1 and S2 are stereoscopically displayed, a head-end boundary surface and a tail-end boundary surface positioned at the zone boundaries (not illustrated) are displayed. The above-described vertical lien erasure processing can be applied to the case where the long-material parts S1 and S2 are stereoscopically displayed. FIG. 21 is a diagram to explain the vertical line erasure processing in the case where the long-material parts S1 and S2 are stereoscopically displayed. FIG. 21(*a*) illustrates a case where the long-material parts S1 and S2 are rolled from left to right, and FIG. 21(*b*) illustrates a case where the long-material parts S1 and S2 are rolled from right to left. Even in any of the rolling directions, in the case where the head-end presence flag is OFF, the web browser processing unit 31 does not draw a head-end surface (hereinafter, referred to as "head-end boundary surface") $I_{HEAD}$ of the long-material part S1 illustrated by a thick line in the drawing, positioned at the zone boundary. In the case where the tail-end presence flag is OFF, the web browser processing unit 31 does not draw a tail-end surface (hereinafter, referred to as "tail-end boundary surface") $I_{TAIL}$ of the long-material part S2 illustrated by a thick line in the drawing, positioned at the zone boundary. The tail-end boundary surface $I_{TAIL}$ includes the tail-end boundary line $L_{TAIL}$ and a region R surrounded by the tail-end boundary line $L_{TAIL}$. As described above, in the case where the long-material parts S1 and S2 are stereoscopically displayed, the head-end boundary surface $I_{HEAD}$ and the tail-end boundary surface $I_{TAIL}$ that do not actually exist at the zone boundary are not drawn, in other words, the head-end boundary surface $I_{HEAD}$ and the tail-end boundary surface $I_{TAIL}$ are erased, which makes it possible to improve presentation to the operator.

Although the embodiment of the present invention is described above, the present invention is not limited to the above-described embodiment, and can be variously modified and implemented without departing from the spirit of the present invention. In the above-described embodiment, the case where the long material is used as the material to be rolled is described, however, the present invention is applicable to a case where a short material is used as the material to be rolled. When numerals of the number, the quantity, the amount, the range, and the like of each of the elements are mentioned in the above-described embodiment, the present invention is not limited to the mentioned numerals except for the case of being particularly clearly mentioned and the case of being obviously specified to the numerals in principle. Further, the structure and the like described in the above-described embodiment are not necessarily essential for the present invention except for the case of being particularly clearly mentioned and the case of being obviously specified to the structure and the like in principle.

REFERENCE SIGNS LIST

R1, R2, R3 First rolling stand, Second rolling stand, Third rolling stand
S1 First long-material part (First material-to-be-rolled part)
S2 Second long-material part (Second material-to-be-rolled part)
H1 First long-material part head-end position (First material-to-be-rolled part head-end position)
H2 Second long-material part head-end position (Second material-to-be-rolled part head-end position)
T1 First long-material part tail-end position (First material-to-be-rolled part tail-end position)
T2 Second long-material part tail-end position (Second material-to-be-rolled part tail-end position)
$S_{TOP}$ Top surface of rectangular parallelepiped
$S_{TAIL}$ Tail-end surface of rectangular parallelepiped
$S_{TOP\_D}$, $S_{TAIL\_D}$ Rectangle
SkewX(θ), SkewY(θ) Affine transformation
$L_{HEAD}$ Head-end boundary line
$L_{TAIL}$ Tail-end boundary line
$I_{HEAD}$ Head-end boundary surface
$I_{TAIL}$ Tail-end boundary surface
1 HMI (SCADA web HMI system)
2 PLC
3 Communication device
4 RIO
5 Supervisory object device
6 Conveyance table
10 Server apparatus
11 PLC signal processing unit
12 Web server processing unit
13 Screen data
14 Part library
15 Device list
20 HMI client apparatus
21 Web browser
22 HMI screen
30 Processing circuit
31 Web browser processing unit
10*a*, 20*a* Processor
10*b*, 20*b* Memory
10*c*, 20*c* Network interface
20*d* Input interface
20*e* Monitor

The invention claimed is:

1. A SCADA web HMI system receiving PLC signals from a programmable logic controller (PLC) at each reception cycle, the SCADA web HMI system comprising at least one processor and at least one monitor, wherein the processor is configured:

to draw, on the monitor, an HMI screen including an extendable/contractible first material-to-be-rolled part arranged in a first zone of a conveyance table for conveying a material to be rolled, and an extendable/contractible second material-to-be-rolled part arranged in a second zone adjacent to the first zone, the first material-to-be-rolled part and the second material-to-be-rolled part being drawn at each drawing cycle shorter than the reception cycle;

to calculate a first material-to-be-rolled part head-end position based on a conveyance speed included in a first PLC signal and an elapsed time from reception of the first PLC signal, at each drawing cycle after the first PLC signal including a timing when a head-end of the material to be rolled enters the first zone and the conveyance speed of the material to be rolled is received, and to set a drawing size of the first material-to-be-rolled part to a length from an entry side of the first zone to the first material-to-be-rolled part head-end position;

to set the drawing size of the first material-to-be-rolled part to a zone length of the first zone, in a case where, when a second PLC signal including a timing when the head-end of the material to be rolled enters the second zone and the conveyance speed of the material to be rolled is received after the first PLC signal is received, the first material-to-be-rolled part head-end position has not reached the second zone;

to calculate a second material-to-be-rolled part head-end position based on the conveyance speed included in the second PLC signal and an elapsed time from reception of the second PLC signal at each drawing cycle after the second PLC signal is received, and to set a drawing size of the second material-to-be-rolled part to a length from an entry side of the second zone to the second material-to-be-rolled part head-end position;

to update the first material-to-be-rolled part head-end position by adding a distance based on the conveyance speed included in a first intermediate PLC signal and an elapsed time from reception of the first intermediate PLC signal, to the first material-to-be-rolled part head-end position at a time when the first intermediate PLC signal is received, in a case where the first intermediate PLC signal including the conveyance speed is received during a period after the first PLC signal is received until the second PLC signal is received; and to set the drawing size of the first material-to-be-rolled part to a length from the entry side of the first zone to the first material-to-be-rolled part head-end position.

2. The SCADA web HMI system according to claim 1, wherein the processor is configured:

to calculate a first material-to-be-rolled part tail-end position based on the conveyance speed included in a third PLC signal and an elapsed time from reception of the third PLC signal, at each drawing cycle after the third PLC signal including a timing when a tail-end of the material to be rolled enters the first zone and the conveyance speed of the material to be rolled is received, and to set the drawing size of the first material-to-be-rolled part to a length from the first material-to-be-rolled part tail-end position to an exit side of the first zone;

to set the drawing size of the first material-to-be-rolled part to zero in a case where, when a fourth PLC signal including a timing when the tail-end of the material to be rolled enters the second zone and the conveyance speed of the material to be rolled is received after the third PLC signal is received, the first material-to-be-rolled part tail-end position has not reached the second zone; and to calculate a second material-to-be-rolled part tail-end position based on the conveyance speed included in the fourth PLC signal and an elapsed time from reception of the fourth PLC signal at each drawing cycle after the fourth PLC signal is received, and to set the drawing size of the second material-to-be-rolled part to a length from the second material-to-be-rolled part tail-end position to an exit side of the second zone.

3. The SCADA web HMI system according to claim 2, wherein the processor is configured:

to update the first material-to-be-rolled part tail-end position by adding a distance based on the conveyance speed included in a third intermediate PLC signal and an elapsed time from reception of the third intermediate PLC signal, to the first material-to-be-rolled part tail-end position at a time when the third intermediate PLC signal is received, in a case where the third intermediate PLC signal including the conveyance speed is received during a period after the third PLC signal is received until the fourth PLC signal is received; and to set the drawing size of the first material-to-be-rolled part to a length from the first material-to-be-rolled part tail-end position to the exit side of the first zone.

4. The SCADA web HMI system according to claim 1, wherein the processor is configured to draw the first material-to-be-rolled part at an initial position in the first zone designated by the received first PLC signal.

5. The SCADA web HMI system according to claim 1, wherein the first PLC signal includes a presence flag, a head-end presence flag, and a tail-end presence flag respectively indicating presence/absence of the first material-to-be-rolled part, a head end of the first material-to-be-rolled part, and a tail end of the first material-to-be-rolled part in the first zone, and the processor is configured to transit a display state of the first material-to-be-rolled part in the first zone based on values of the presence flag, the head-end presence flag, and the tail-end presence flag.

6. The SCADA web HMI system according to claim 1, wherein the processor is configured to erase, after the head end of the material to be rolled enters the second zone, a head-end boundary line of the first material-to-be-rolled part positioned at a boundary between the first zone and the second zone, and a tail-end boundary line of the second material-to-be-rolled part positioned at the boundary.

7. The SCADA web HMI system according to claim 1, the processor stereoscopically drawing the first material-to-be-rolled part and the second material-to-be-rolled part as rectangular parallelepipeds, wherein the processor is configured to, when a length of each of the rectangular parallelepipeds in a conveyance direction is changed, develop and decompose the rectangular parallelepiped to rectangles, change a length in the conveyance direction while the rectangular parallelepiped is decomposed to the rectangles, and apply affine transformation to each of the rectangle corresponding to a top surface of the rectangular parallelepiped and the rectangle corresponding to a tail-end surface of the rectangular parallelepiped in the conveyance direction, thereby generating the top surface and the tail-end surface each having a parallelogram.

8. The SCADA web HMI system according to claim 7, wherein the processor is configured to erase, after the head end of the material to be rolled enters the second zone, a head-end boundary surface as a head-end surface in the conveyance direction of the first material-to-be-rolled part positioned at a boundary between the first zone and the second zone, and a tail-end boundary surface as a tail-end surface of the second material-to-be-rolled part positioned at the boundary.

9. The SCADA web HMI system according to claim 1, wherein the material to be rolled is a long material to be rolled by a tandem rolling mill, and each of the first zone and the second zone is a zone between rolling stands of the tandem rolling mill.

10. The SCADA web HMI system according to claim 1, wherein the processor is configured to execute a web browser, and the web browser draws the HMI screen at each drawing cycle.

* * * * *